US009756066B2

(12) United States Patent
Gupta et al.

(10) Patent No.: US 9,756,066 B2
(45) Date of Patent: *Sep. 5, 2017

(54) SECURE BEHAVIOR ANALYSIS OVER TRUSTED EXECUTION ENVIRONMENT

(71) Applicant: QUALCOMM Incorporated, San Diego, CA (US)

(72) Inventors: Rajarshi Gupta, Sunnyvale, CA (US); Soorgoli Ashok Halambi, Cupertino, CA (US); Yoram Rimoni, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 53 days.

This patent is subject to a terminal disclaimer.

(21) Appl. No.: 14/957,850

(22) Filed: Dec. 3, 2015

(65) Prior Publication Data

US 2016/0088009 A1    Mar. 24, 2016

Related U.S. Application Data

(63) Continuation of application No. 13/929,082, filed on Jun. 27, 2013, now Pat. No. 9,319,897.

(Continued)

(51) Int. Cl.
*H04W 24/00*  (2009.01)
*H04L 29/06*  (2006.01)
(Continued)

(52) U.S. Cl.
CPC ........ *H04L 63/1425* (2013.01); *G06F 21/554* (2013.01); *G06F 21/57* (2013.01);
(Continued)

(58) Field of Classification Search
USPC ............................................ 455/425; 726/30
See application file for complete search history.

(56) References Cited

U.S. PATENT DOCUMENTS 6,647,260 B2    11/2003   Dusse et al.
7,852,938 B2    12/2010   Shi et al.
(Continued)

FOREIGN PATENT DOCUMENTS

CN         1961525 A       5/2007
CN       101689167 A       3/2010
(Continued)

OTHER PUBLICATIONS

Hu W., et al., "Online Adaboost-Based Parameterized Methods for Dynamic Distributed Network Intrusion Detection", IEEE Transactions on Cybernetics, vol. 44, No. 1, Mar. 27, 2013 (Mar. 27, 2013), pp. 66-82, XP011533908, DOI: 10.1109/TCYB.2013.2247592.

(Continued)

*Primary Examiner* — David Q Nguyen
(74) *Attorney, Agent, or Firm* — The Marbury Law Group, PLLC

(57) ABSTRACT

Systems and methods for recognizing and reacting to malicious or performance-degrading behaviors in a mobile computing device include observing mobile device behaviors in an observer module within a privileged-normal portion of a secure operating environment to identify a suspicious mobile device behavior. The observer module may generate a behavior vector based on the observations, and provide the vector to an analyzer module in an unprivileged-secure portion of the secure operating environment. The vector may be analyzed in the unprivileged-secure portion to determine whether the mobile device behavior is benign, suspicious, malicious, or performance-degrading. If the behavior is found to be suspicious, operations of the observer module may be adjusted, such as to perform deeper observations. If the behavior is found to be malicious or performance- (Continued)

degrading behavior the user and/or a client module may be alerted in a secure, tamper-proof manner.

30 Claims, 18 Drawing Sheets

Related U.S. Application Data

(60) Provisional application No. 61/755,171, filed on Jan. 22, 2013, provisional application No. 61/683,274, filed on Aug. 15, 2012.

(51) Int. Cl.
*H04W 24/02* (2009.01)
*G06F 21/55* (2013.01)
*H04W 12/12* (2009.01)
*G06F 21/57* (2013.01)
*H04W 24/08* (2009.01)

(52) U.S. Cl.
CPC ......... *H04L 63/1466* (2013.01); *H04W 12/12* (2013.01); *H04W 24/02* (2013.01); *H04W 24/08* (2013.01)

(56) References Cited

U.S. PATENT DOCUMENTS

| | | | |
|---|---|---|---|
| 8,108,929 | B2 | 1/2012 | Agrawal et al. |
| 8,782,412 | B2 | 7/2014 | Charles et al. |
| 8,943,204 | B2 | 1/2015 | Caldeira De Andrada et al. |
| 9,319,897 | B2 * | 4/2016 | Gupta ............... G06F 21/554 |
| 9,432,361 | B2 | 8/2016 | Mahaffey et al. |
| 2007/0174490 | A1 | 7/2007 | Choi et al. |
| 2009/0019551 | A1 | 1/2009 | Haga et al. |
| 2009/0192955 | A1 | 7/2009 | Tang et al. |
| 2009/0293121 | A1 | 11/2009 | Bigus et al. |
| 2010/0005045 | A1 | 1/2010 | Hiraoka et al. |
| 2010/0010949 | A1 | 1/2010 | Ito et al. |
| 2010/0192222 | A1 | 7/2010 | Stokes et al. |
| 2012/0167219 | A1 | 6/2012 | Zaitsev et al. |
| 2012/0331137 | A1 | 12/2012 | Olsen et al. |
| 2014/0032358 | A1 | 1/2014 | Perkowitz et al. |
| 2015/0339675 | A1 | 11/2015 | Tuchman et al. |
| 2015/0356462 | A1 | 12/2015 | Fawaz et al. |

FOREIGN PATENT DOCUMENTS

| | | |
|---|---|---|
| CN | 101770453 A | 7/2010 |
| CN | 101882000 A | 11/2010 |
| CN | 102110211 A | 6/2011 |
| CN | 102202102 A | 9/2011 |
| CN | 102222192 A | 10/2011 |
| CN | 102651061 A | 8/2012 |
| CN | 102790758 A | 11/2012 |
| EP | 2515250 A1 | 10/2012 |
| JP | 2008234520 A | 10/2008 |
| JP | 2010113488 A | 5/2010 |
| JP | 2010520566 A | 6/2010 |
| JP | 2011138219 A | 7/2011 |
| JP | 2012212380 A | 11/2012 |
| KR | 20060033067 A | 4/2006 |
| TW | 201129817 A | 9/2011 |
| WO | 2006012375 | 2/2006 |
| WO | 2009017231 A2 | 2/2009 |

OTHER PUBLICATIONS

Jean E., et al., "Addressing Mobile Agent Security Through Agent Collaboration", Journal of Information Processing Systems, vol. 3, No. 2, Dec. 2007 (Dec. 2007), pp. 43-53, XP055341844, DOI: 10.3745/JIPS.2008.3.2.043.

Faddoul J.B., et al., "Boosting Multi-Task Weak Learners with Applications to Textual and Social Data," Ninth International Conference on Machine Learning and Applications (ICMLA), Dec. 2010, pp. 367-372.

Niculescu-Mizil A., et al., "Predicting Good Probabilities with Supervised Learning", Proceedings/Twenty-Second International Conference on Machine Learning, Bonn, Germany, Aug. 7-11, 2005, Association for Computing Machinery, New York, Aug. 7, 2005 (Aug. 7, 2005), XP058203964,DOI: 10.1145/1102351.11 024301SBN: 978-1-59593-180-1.

* cited by examiner

SECURE BEHAVIOR ANALYSIS OVER TRUSTED EXECUTION ENVIRONMENT

RELATED APPLICATIONS

This application is a continuation of U.S. patent application Ser. No. 13/929,082 entitled "Secure Behavior Analysis Over Trusted Execution Environment" filed Jun. 27, 2013, which claims the benefit of priority to U.S. Provisional Patent Application No. 61/755,171 entitled "Secure Behavior Analysis over Trusted Execution Environment" filed Jan. 22, 2013, and U.S. Provisional Application No. 61/683,274, entitled "System, Apparatus and Method for Adaptive Observation of Mobile Device Behavior" filed Aug. 15, 2012, the entire contents of both which are hereby incorporated by reference for all purposes.

BACKGROUND

Cellular and wireless communication technologies have seen explosive growth over the past several years. This growth has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever. This complexity has created new opportunities for malicious software, software conflicts, hardware faults, and other similar errors or phenomena to negatively impact a mobile device's long-term and continued performance and power utilization levels. Accordingly, identifying and correcting the conditions and/or mobile device behaviors that may negatively impact the mobile device's long term and continued performance and power utilization levels is beneficial to consumers.

SUMMARY

The various aspects include methods, devices and systems for adaptive observations of behavior features of mobile devices in order to efficiently identify, prevent, and/or correct the conditions and/or mobile device behaviors that often degrade a mobile device's performance and/or power utilization levels over time. An aspect includes a method for observing mobile device behaviors over a period of time to recognize mobile device behaviors inconsistent with normal operation patterns. This method may include observing a mobile device behavior in an observer module in a privileged-normal portion of a secure operating environment to identify a suspicious mobile device behavior, generating a concise behavior vector in the privileged-normal portion based on the observations, sending the concise behavior vector to an analyzer module in an unprivileged-secure portion of the secure operating environment (e.g., sending the vector across a secure protection boundary and/or storing the vector in a secure buffer), and analyzing the concise behavior vector in the unprivileged-secure portion to determine whether the mobile device behavior is benign, suspicious, malicious, or performance-degrading. In an aspect the method may further include guiding further observations of mobile device behavior based on whether the observed mobile device behaviors is determined to be suspicious, which may include communicating with the observer module to request deeper observation of a suspicious behavior.

In an aspect the method may further include alerting the user of the device and/or a client module of identified malicious or performance-degrading behavior in a secure, tamper-proof manner. In an aspect, observing a mobile device behavior in an observer module in a privileged-normal portion of a secure operating environment to identify a suspicious mobile device behavior may include collecting behavior information from a module in an unprivileged-normal portion of the secure operating environment via an instrumented API. In an aspect, analyzing the concise behavior vector in the unprivileged-secure portion to determine whether the mobile device behavior is benign, suspicious, malicious, or performance-degrading may include sending a result of the analysis to a client module in an unprivileged-normal portion of the secure operating environment by writing the result in the secure buffer. In an aspect the method may further include sending a secure tamper-proof message to the user of the mobile device alerting to the possibility of malicious or performance-degrading behavior in response to determining that the mobile device behavior is malicious or performance-degrading behavior.

A further aspect includes a computing device having a processor configured with processor-executable instructions to perform operations of the methods described above. A further aspect includes a computing device having means for performing the functions and operations of the methods described above. A further aspect includes a non-transitory processor-readable storage medium having stored thereon processor-executable instructions configured to cause a processor to perform operations of the methods described above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
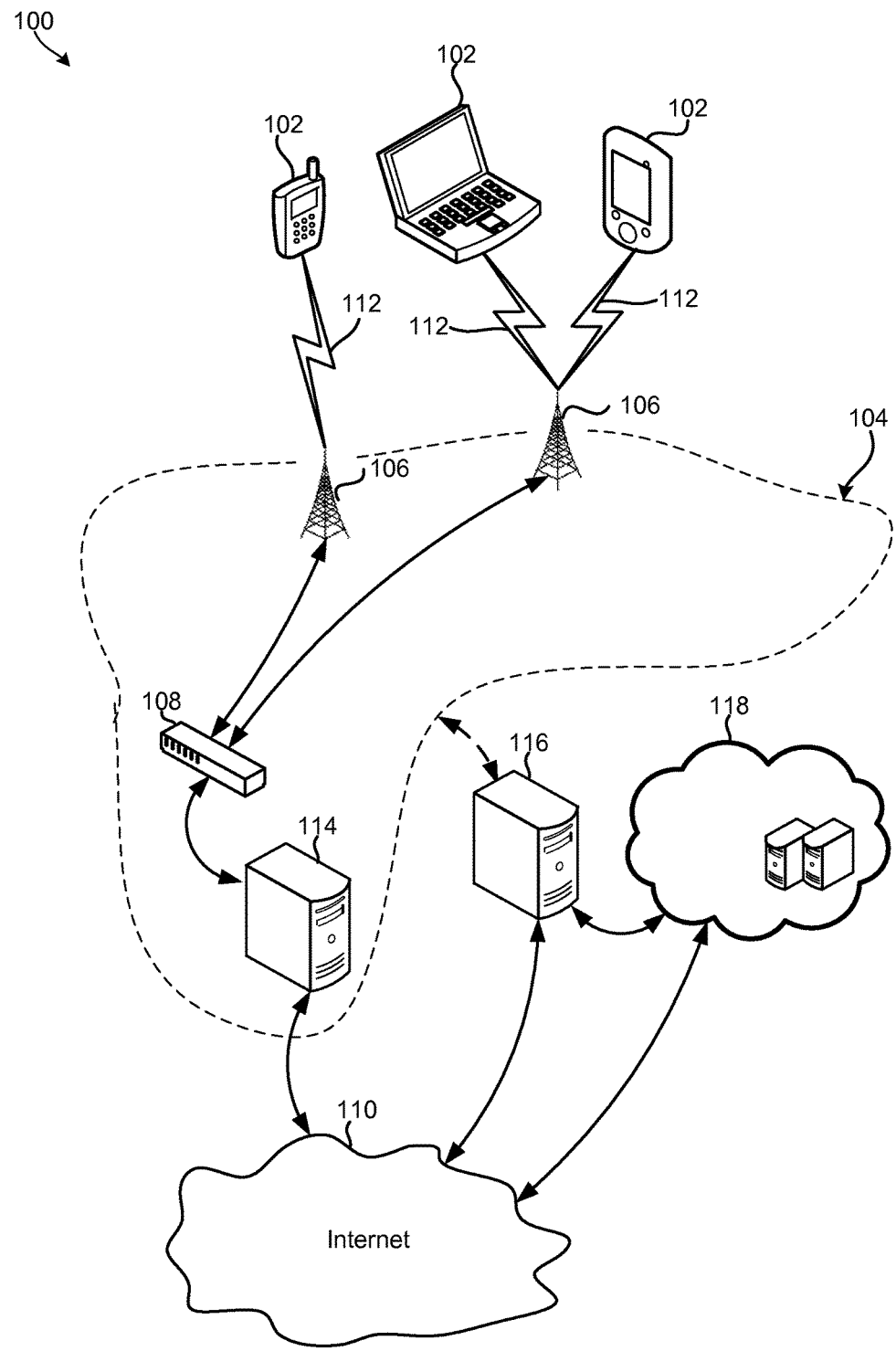
FIG. 1 is a communication system block diagram illustrating network components of an example telecommunication system suitable for use in the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "computing device" and "mobile device" are used interchangeably herein to refer to any one or all of cellular telephones, smartphones, personal or mobile multimedia players, personal data assistants (PDA's), laptop computers, tablet computers, smartbooks, ultrabooks, palmtop computers, wireless electronic mail receivers, multimedia Internet enabled cellular telephones, wireless gaming controllers, and similar personal electronic devices that include a memory, a programmable processor for which performance is important, and operate under battery power such that power conservation methods are of benefit. While the various aspects are particularly useful for mobile computing devices, such as smartphones, which have limited resources and run on battery, the aspects are generally useful in any electronic device that includes a processor and executes application programs.

Many mobile computing devices operating system kernels are organized into a user space (where unprivileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The terms "performance degrading" and "performance degradation" are used herein to refer to a wide variety of undesirable mobile device operations and characteristics, such as longer processing times, lower battery life, loss of private data, malicious economic activity (e.g., sending unauthorized premium SMS message), operations relating to commandeering the mobile device or utilizing the phone for spying or botnet activities, etc.

The various aspects provide mobile devices, systems, and methods for efficiently identifying, classifying, modeling, preventing, and/or correcting the conditions and/or mobile device behaviors that often degrade a mobile device's performance and/or power utilization levels over time. By implementing, actuating, storing, and/or executing different modules or subsystems in different privilege/protection domains or in different portions of a secure computing environment or trusted execution environment (e.g., ARM TrustZone®, etc.), the various aspects provide a secure and efficient system for identifying and correcting problematic mobile device behaviors that balances tradeoffs between mobile device security, performance, and power efficiency.

Generally, the performance and power efficiency of a mobile device degrade over time. Recently, anti-virus companies (e.g., McAfee, Symantec, etc.) have begun marketing mobile anti-virus, firewall, and encryption products that aim to slow this degradation. However, many of these solutions rely on the periodic execution of a computationally-intensive scanning engine on the mobile device, which may consume many of the mobile device's processing and battery resources, slow or render the mobile device useless for extended periods of time, and/or otherwise degrade the user experience. In addition, these solutions are typically limited to detecting known viruses and malware, and do not address the multiple complex factors and/or the interactions that often combine to contribute to a mobile device's degradation over time (e.g., when the performance degradation is not caused by viruses or malware). For these and other reasons, existing anti-virus, firewall, and encryption products do not provide adequate solutions for identifying the numerous factors that may contribute to a mobile device's degradation over time, for preventing mobile device degradation, or for efficiently restoring an aging mobile device to its original condition.

There are a variety of factors that may contribute to the degradation in performance and power utilization levels of a mobile device over time, including poorly designed software applications, malware, viruses, fragmented memory, background processes, etc. However, due to the complexity of modern mobile devices, it is increasingly difficult for users, operating systems, and/or application programs (e.g., anti-virus software, etc.) to accurately and efficiently identify the sources of such problems and/or to provide adequate remedies to identified problems. As a result, mobile device users currently have few remedies for preventing the degradation in performance and power utilization levels of a mobile device over time, or for restoring an aging mobile device to its original performance and power utilization levels.

To provide better performance in view of these facts, the various aspects include mobile devices configured to intelligently and efficiently identify factors that may contribute to the degradation in performance and power utilization levels of the mobile devices over time without consuming an excessive amount of processing, memory, or energy resources of the mobile device.

Modern mobile devices enable their users to download and execute a variety of software applications from application download services (e.g., Apple® App Store, Windows® Store, Google® play, etc.) or the Internet. Further, mobile device users now demand the capability to purchase goods, send and receive communication, pay bills, manage bank accounts and conduct other secure or sensitive transactions on their mobile devices via downloaded applications. To meet user demands for these features, mobile device operating systems now allow third party software applications to have access to many operating system components and functions that have traditionally been restricted to a small number of trusted applications/processes. Due to these trends, mobile devices are quickly becoming the next frontier for cyber-attacks via malicious software applications, Trojans, and rootkits (collectively "malware"). Such malware is increasingly being used by thieves and hackers to launch attacks on mobile devices and steal confidential information from mobile devices. Consequently, any mobile device application, system or module that has access to broad swaths of the mobile device, such as a comprehensive behavior observation and analysis system, may quickly become a target of such malware.

To meet mobile device user demands for both features and security, mobile device manufacturers have developed various trusted execution environments (e.g., ARM Trust-Zone®, etc.) that aim to provide the mobile device users with both an open, feature-rich, operating environment and robust security. These solutions establish a trusted execution zone in which a pre-authenticated software application is provided access to privileged or restricted features/operations of an operating system, such as the ability to modify system files, start or stop daemons, create or remove users/groups, or override the protections of the operating system. However, these solutions rely heavily on the pre-authentication process, and a malicious software application may simply circumvent the authentication process to gain access to a trusted zone (and thus access to the privileged or restricted features/operations of an operating system). In addition, these solutions typically require that all information communicated to and from the pre-authenticated software application be verified, encrypted and/or otherwise secured, which may consume a significant amount of processing and energy resources of the mobile device. For these and other reasons, existing solutions are not suitable for use with software systems that require frequent updates or that read, write, or otherwise communicate a large amount of information to and from a network server, between modules or applications, or across protection domains, as may be required of in comprehensive mobile device behavior observation and analysis system.

To overcome these additional limitations of existing solutions, the various aspects intelligently group, implement, actuate, store, and/or execute different behavior observation and analysis features, functions, or modules in different privilege/protection domains and/or in different portions of a secure computing environment (or a trusted execution environment) to provide a secure and efficient mobile device system for identifying and correcting problematic mobile device behaviors that balances tradeoffs between the security, performance, and power efficiency of the mobile device.

The various aspects include a secure behavior observation and analysis system that is protected from an exploited/compromised operating system, spoofed observation data, denial of service attacks, and from the unauthorized modification or stealing of behavior information (e.g., logs, data models, etc.). Various aspects may enable the behavior observation and analysis system to communicate securely with both the mobile device user and with a network or cloud server.

In an aspect, a mobile device may be equipped with a secure computing environment having multiple privilege/protection domains, areas or portions. In an aspect, the mobile device may be equipped with a secure computing environment organized into an unprivileged-normal portion, an unprivileged-secure portion, a privileged-normal portion, and a privileged-secure portion.

In an aspect, an observer process, daemon, module, or sub-system (herein collectively referred to as a "module") of the mobile device may instrument or coordinate various application programming interfaces (APIs) at various levels of the mobile device system, and collect behavior information from the instrumented APIs, and generate concise behavior vectors from the collected behavior information. The observer module may constantly monitor the mobile device (via a low power process, background processes, etc.) to identify the normal operation patterns of the mobile device and/or to identify behaviors that are not consistent with previously computed normal operation patterns. In an aspect, the observer module may be included in a privileged-normal portion of a secure computing environment or trusted execution environment of the mobile device.

In an aspect, the mobile device may include an analyzer module, and the observer module may be configured to communicate (e.g., via a memory write operation, function call, etc.) the collected behavior information to the analyzer module (e.g., via a memory write operation, etc.). The analyzer module may analyze and/or classify the collected behavior information, generate or update behavior vectors, generate spatial and/or temporal correlations based on the generated behavior vectors and information collected from various other mobile device sub-systems, and determine whether a particular mobile device behavior, software application, or process is benign, suspicious, malicious, or performance-degrading. In an aspect, the analyzer module may be included in an unprivileged-secure portion of a secure computing environment or trusted execution environment of the mobile device.

In an aspect, the mobile device may include an actuation module, and the analyzer module may communicate (e.g., via a memory write operation, function call, etc.) the results of its real-time analysis operations to the actuator module. The actuation module may perform various actions or operations to correct mobile device behaviors determined to be malicious or performance-degrading and/or perform operations to heal, cure, isolate, or otherwise fix identified problems. In various aspects, the actuation module may be included in an unprivileged-normal portion, an unprivileged-secure portion, or a privileged-normal portion of a secure computing environment or trusted execution environment of the mobile device.

In the various aspects, the mobile device may include a client module configured to receive data/behavior models from one or more third-party network servers and communicate the received information to the observer and/or analyzer modules of the mobile device. The third party servers may be maintained by one or more partner companies that have domain expertise in a particular area or technology that is relevant for identifying, analyzing, classifying, and/or reacting to mobile device behaviors, but that do not have access to (or knowledge of) the various mobile device sub-systems, interfaces, configurations, modules, processes, drivers, and/or hardware systems required to generate effective data/behavior models suitable for use by the mobile device. In an aspect, the client module may be included in an unprivileged-normal portion of a secure computing environment or trusted execution environment of the mobile device.

The various aspects may be implemented within a variety of communication systems, such as the example communication system 100 illustrated in FIG. 1. A typical cell telephone network 104 includes a plurality of cell base stations 106 coupled to a network operations center 108, which operates to connect voice calls and data between mobile devices 102 (e.g., cell phones, laptops, tablets, etc.) and other network destinations, such as via telephone land lines (e.g., a POTS network, not shown) and the Internet 110. Communications between the mobile devices 102 and the telephone network 104 may be accomplished via two-way wireless communication links 112, such as 4G, 3G, CDMA, TDMA, LTE and/or other cell telephone communication technologies. The telephone network 104 may also include one or more servers 114 coupled to or within the network operations center 108 that provide a connection to the Internet 110.

The communication system 100 may further include network servers 18 connected to the telephone network 104 and to the Internet 110. The connection between the network server 116 and the telephone network 104 may be through the Internet 110 or through a private network (as illustrated by the dashed arrows). The network server 116 may also be implemented as a server within the network infrastructure of a cloud service provider network 118. Communication between the network server 116 and the mobile devices 102 may be achieved through the telephone network 104, the Internet 110, private network (not illustrated), or any combination thereof.

The network server 116 may send lean data/behavior models to the mobile device 102, which may receive and use lean data/behavior models to identify suspicious or performance-degrading mobile device behaviors, software applications, processes, etc. The network server 116 may also send classification and modeling information to the mobile devices 102 to replace, update, create and/or maintain mobile device data/behavior models.

The mobile device 102 may collect behavioral, state, classification, modeling, success rate, and/or statistical information in the mobile device 102, and send the collected information to the network server 116 (e.g., via the telephone network 104) for analysis. The network server 116 may use information received from the mobile device 102 to update or refine the lean data/behavior models or the classification/modeling information to include a further targeted and/or reduced subset of features.

Figure 2:
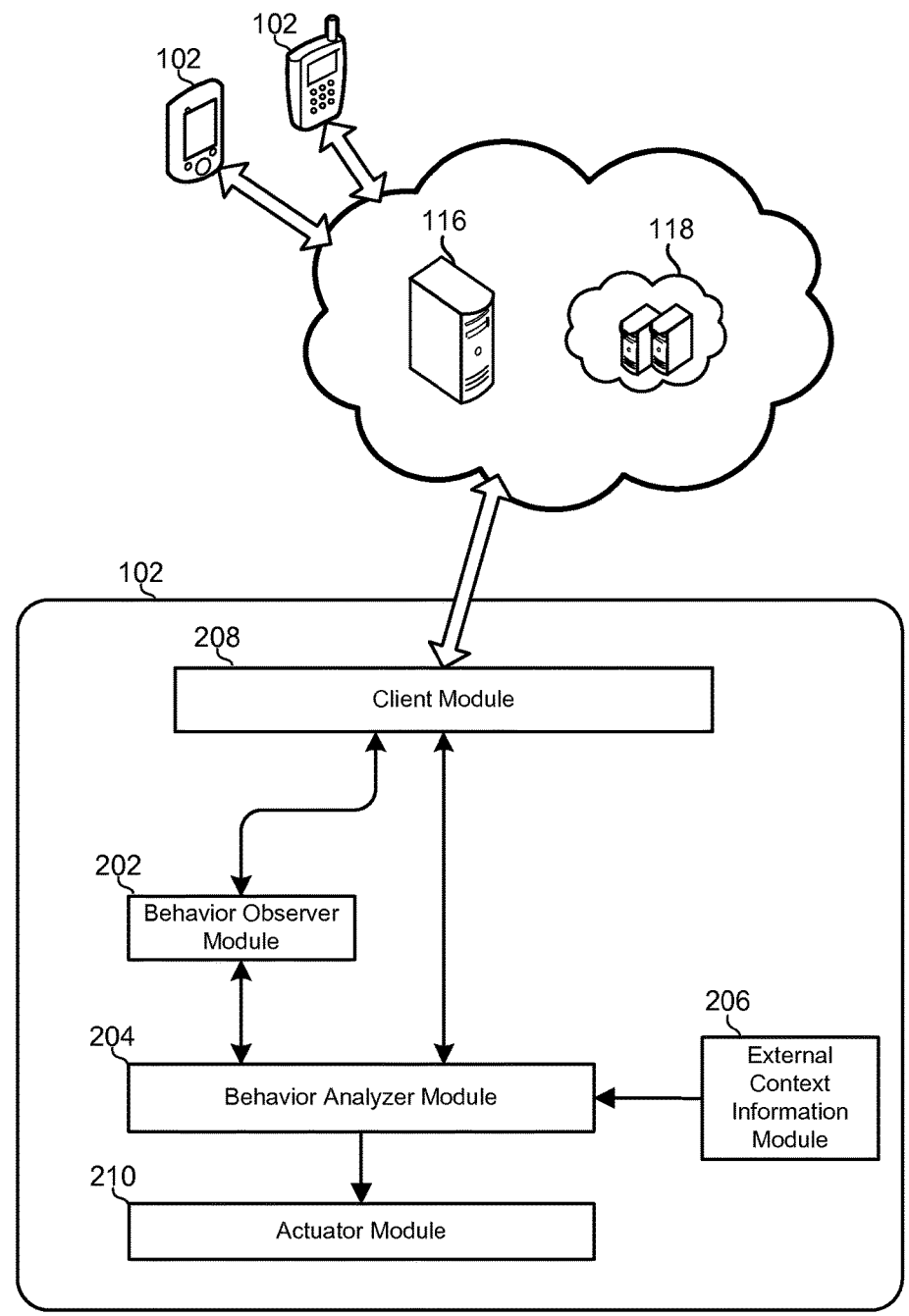
FIG. 2 is a block diagram illustrating example logical components and information flows in an aspect mobile device configured to determine whether a particular mobile device behavior, software application, or process is performance-degrading, suspicious, or benign.

FIG. 2 illustrates example logical components and information flows in an aspect mobile device 102 configured to determine whether a particular mobile device behavior, software application, or process is malicious/performance-degrading, suspicious, or benign. In the example illustrated in FIG. 2, the mobile device 102 includes a behavior observer module 202, a behavior analyzer module 204, an external context information module 206, a client module 208, and an actuator module 210.

Each of the modules 202-210 may be implemented in software, hardware, or any combination thereof. In an aspect, one or more of the modules 202-210 may be implemented as software instructions executing on one or more processors of the mobile device 102. In various aspects, the modules 202-210 may be implemented within parts of the operating system (e.g., within the kernel, in the kernel space, in the user space, etc.), within separate programs or applications, in specialized hardware buffers or processors, or any combination thereof.

In an aspect, the mobile device 102 may include secure computing environment. In an aspect, the client module 208 may be implemented in an unprivileged-normal portion of the secure computing environment of the mobile device. In an aspect, the behavior observer module 202 may be implemented in a privileged-normal portion of the secure computing environment. In various aspects, the behavior analyzer module 204 and/or actuator module 210 may be included in an unprivileged-secure portion of the secure computing environment. In various aspects, the actuation module 210 may be in the unprivileged-normal portion or the privileged-normal portion of the secure computing environment.

The behavior observer module 202 may be configured to perform cross-layer observations on various mobile device modules and sub-systems encompassing webkit, SDK, NDK, kernel, drivers, and hardware in order to characterize the mobile device behavior.

The behavior observer module 202 may be configured to instrument or coordinate application programming interfaces (APIs) at various levels/modules of the mobile device, and monitor/observe mobile device operations and events (e.g., system events, state changes, etc.) at the various levels/modules via the instrumented APIs, collect information pertaining to the observed operations/events, intelligently filter the collected information, generate one or more observations based on the filtered information, and store the generated observations in a memory (e.g., in a log file, etc.) and/or send (e.g., via memory writes, function calls, etc.) the generated observations to the behavior analyzer module 204.

The observer module 202 may monitor/observe mobile device operations and events by collecting information pertaining to library API calls in an application framework or run-time libraries, system call APIs, file-system and networking sub-system operations, device (including sensor devices) state changes, and other similar events. The observer module 202 may also monitor file system activity, which may include searching for filenames, categories of file accesses (personal info or normal data files), creating or deleting files (e.g., type exe, zip, etc.), file read/write/seek operations, changing file permissions, etc.

The observer module 202 may also monitor data network activity, which may include types of connections, protocols, port numbers, server/client that the device is connected to, the number of connections, volume or frequency of communications, etc. The observer module 202 may monitor phone network activity, which may include monitoring the type and number of calls or messages (e.g., SMS, etc.) sent out, received, or intercepted (e.g., the number of premium calls placed).

The observer module 202 may also monitor the system resource usage, which may include monitoring the number of forks, memory access operations, number of files open, etc. The observer module 202 may monitor the state of the mobile device, which may include monitoring various factors, such as whether the display is on or off, whether the device is locked or unlocked, the amount of battery remaining, the state of the camera, etc. The observer module 202 may also monitor inter-process communications (IPC) by, for example, monitoring intents to crucial services (browser, contracts provider, etc.), the degree of inter-process communications, pop-up windows, etc.

The observer module 202 may also monitor driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device.

The observer module 202 may also monitor one or more hardware counters that denote the state or status of the mobile computing device and/or mobile device sub-systems. A hardware counter may include a special-purpose register of the processors/cores that is configured to store a count or state of hardware-related activities or events occurring in the mobile computing device.

To reduce the number of factors monitored to a manageable level, in an aspect, the observer module 202 may perform coarse observations by monitoring/observing an initial set of behaviors or factors that are a small subset of all factors that could contribute to the mobile device's degradation. In an aspect, the observer module 202 may receive the initial set of behaviors and/or factors from a network server 116 and/or a component in a cloud service or network 118 via the client module 208. In an aspect, the initial set of behaviors/factors may be specified in data/behavior models received from the network server 116 or cloud service/network 118.

The behavior analyzer module 204 may receive the observations from the observer module 202, compare the received information (i.e., observations) with contextual information received from the external context information module 206, and identify subsystems, processes, and/or applications associated with the received observations that are contributing to (or are likely to contribute to) the device's degradation over time, or that may otherwise cause problems on the device.

In an aspect, the behavior analyzer module 204 may include intelligence for utilizing a limited set of information (i.e., coarse observations) to identify behaviors, processes, or programs that are contributing to—or are likely to contribute to—the device's degradation over time, or that may otherwise cause problems on the device. For example, the behavior analyzer module 204 may be configured to analyze information (e.g., in the form of observations) collected from various modules (e.g., the observer module 202, client module 208, etc.), learn the normal operational behaviors of the mobile device, generate one or more behavior vectors based the results of the comparisons, and compare the generated behavior vectors to one or more behavior modules to determine whether a particular mobile device behavior, software application, or process is performance-degrading/malicious, benign, or suspicious.

When the analyzer module 204 determines that a behavior, software application, or process is malicious or performance-degrading, the analyzer module 204 may notify the actuator module 210, which may perform various actions or operations to correct mobile device behaviors determined to be malicious or performance-degrading and/or perform operations to heal, cure, isolate, or otherwise fix the identified problem.

When the analyzer module 204 determines that a behavior, software application, or process is suspicious, the analyzer module 204 may notify the behavior observer module 202, which may adjust the adjust the granularity of its observations (i.e., the level of detail at which mobile device behaviors are observed) and/or change the behaviors that are observed based on information received from the analyzer module 204 (e.g., results of the real-time analysis operations), generate or collect new or additional behavior information, and send the new/additional information to the behavior analyzer module 204 for further analysis/classification. Such feedback communications between the observer module 202 and the analyzer module 204 enable the mobile device 102 to recursively increase the granularity of the observations (i.e., make finer or more detailed observations) or change the features/behaviors that are observed until a source of a suspicious or performance-degrading mobile device behavior is identified, until a processing or battery consumption threshold is reached, or until the mobile device processor determines that the source of the suspicious or performance-degrading mobile device behavior cannot be identified from further increases in observation granularity. Such feedback communication also enable the mobile device 102 to adjust or modify the data/behavior models locally in the mobile device without consuming an excessive amount of the mobile device's processing, memory, or energy resources.

In an aspect, the observer module 202 and the analyzer module 204 may provide, either individually or collectively, real-time behavior analysis of the computing system's behaviors to identify suspicious behavior from limited and coarse observations, to dynamically determine behaviors to observe in greater detail, and to dynamically determine the level of detail required for the observations. In this manner, the observer module 202 enables the mobile device 102 to efficiently identify and prevent problems from occurring on mobile devices without requiring a large amount of processor, memory, or battery resources on the device.

The client module 208 may be configured to decode, interpret, evaluate, combine, organizing and/or encode observed behavior information, mobile device features, and data models into a communication message suitable for transmission to the third party server and/or suitable for sending to the behavior observer and analyzer modules. In various aspects, the communication message may include: information identifying the existence or presence of a condition on the mobile device; a count or frequency of the condition; an ordering of features; an identified combination of events or conditions; a structure or mapping expressed as a finite state machine; an identification or classification (e.g., benign, malicious, suspicious, etc.) of an observed mobile device features or conditions; a mapping of suggested actions/actuations to mobile device features or conditions; recommendations for performing further observation actions; and other similar information. The communication message may also include a request for further observation, a request for behavior logs, and a request for actuation.

In an aspect, when the behavior analyzer module 204 determines that a behavior, software application, or process is suspicious, the behavior analyzer module 204 may notify the client module 208, which may format and send the behavior information to the network server 116 and/or a component in a cloud service or network 118 for further analysis and use in generating future models. The network server 116 may be configured to generate or update its data/behavior models by performing, executing, and/or applying machine learning and/or context modeling techniques to the behavior information and/or results of behavior analyses provided by many mobile devices. Thus, the network server may receive a large number of reports from many mobile devices and analyze, consolidate or otherwise turn such crowd-sourced information into useable information, particularly focused behavior models that can be used or accessed by all mobile devices. In this manner, many mobile devices 102 can instantly benefit from the behaviors and conclusions of other mobile devices.

Figure 3A:
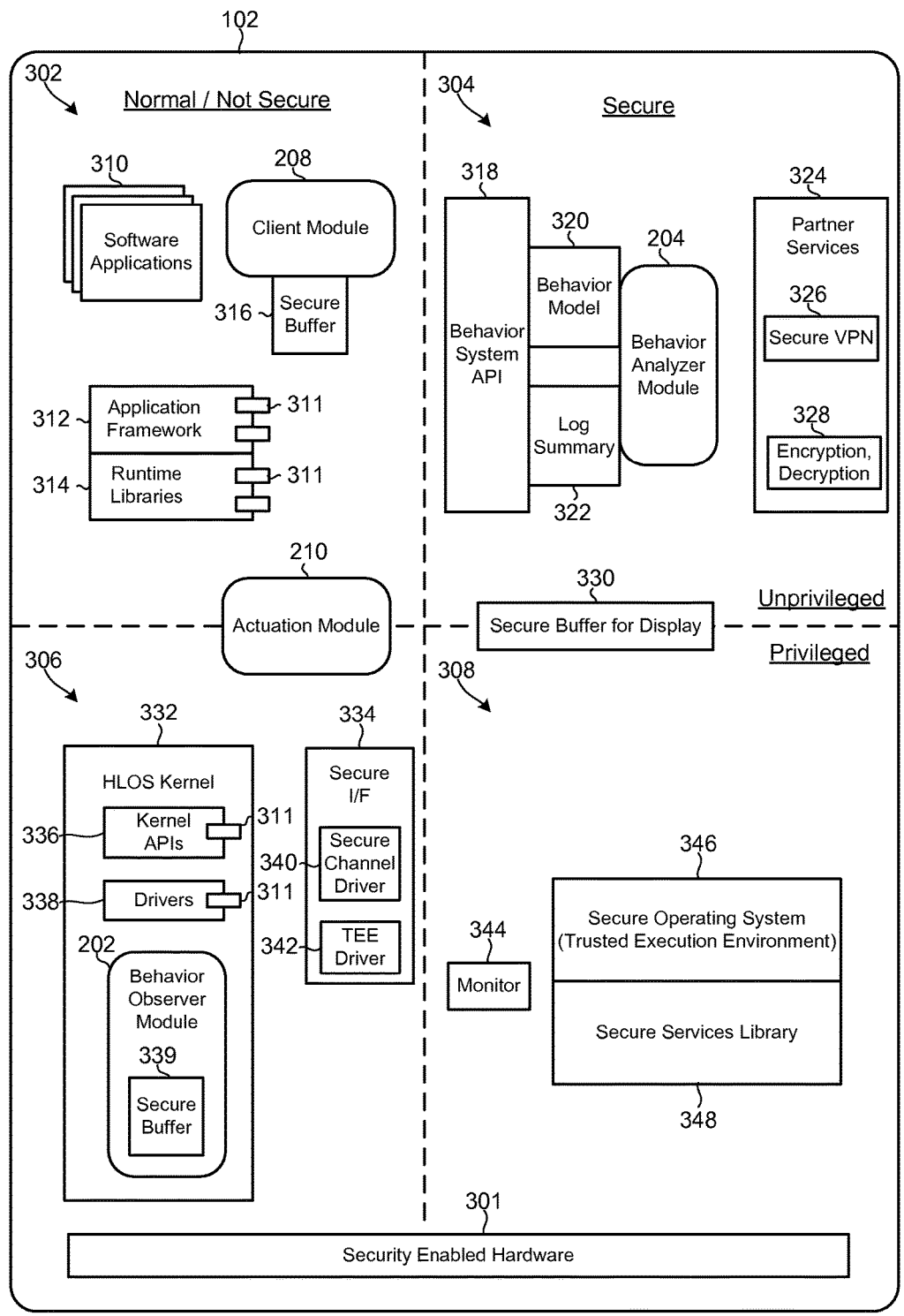
FIGS. 3A-3E are block diagrams illustrating example logical components and information flows in an aspect system configured to securely identify and correct problematic mobile device behaviors while balancing tradeoffs between security, performance, and power efficiency.

FIG. 3A illustrates example logical components in an aspect mobile device configured to provide a secure and efficient system for identifying and correcting problematic mobile device behaviors and balance tradeoffs between mobile device security, performance, and power efficiency. In the example illustrated in FIG. 3A, the mobile device 102 includes a secure computing environment that includes security enabled hardware 301 and software divided into four protection domains/portions, namely an unprivileged-normal portion 302, an unprivileged-secure portion 304, a privileged-normal portion 306, and a privileged-secure portion 308.

The unprivileged-normal portion 302 may include software applications 310, an application framework 312, runtime libraries 314, a secure buffer module 316, and a client module 208. In an aspect, the unprivileged-normal portion 302 may also include an actuation module 210. The secure buffer module 316 may be configured to enable communication between various logical components and across protection domains/portions.

In an aspect, the secure buffer module 316 may be configured so that any module in any protection domain/portion 302-308 may write to its memory, but only modules in the secure portions 304, 308 may read the information stored in the memory. For example, the secure buffer module 316 may be configured so that the behavior observer module 202, the behavior analyzer module 204, and the partner services module 324 may write to its memory, but only the behavior analyzer module 204 and the partner services module 324 may read from its memory.

The unprivileged-secure portion 304 may include a behavior system API module 318, a behavior model module 320, a log summary module 322, and a behavior analyzer module 204. In an aspect, the unprivileged-secure portion 304 may further include a partner services module 324 that includes a secure virtual private network (VPN) module 324 and an encryption/decryption module 328. In an aspect, the unprivileged-secure portion 304 may also include a secure buffer for display 330, which may be suitable for communicating security-encrypted information generated in the unprivileged-secure portion 304 to an electronic display or display subsystem of the computing device. In an aspect, the unprivileged-secure portion 304 may be configured so that buffer control may be transferred directly to the display subsystem (not illustrated).

The privileged-normal portion 306 may include a high level operating system (HLOS) kernel 332 and secure infrastructure 334. The HLOS kernel 332 may include a kernel API module 336, a drivers module 338 and a behavior observer module 202, which may include a secure buffer 339. The secure infrastructure 334 may include a secure channel driver module 340 and a secure operating system or trusted execution environment driver module 342. In an aspect, the privileged-normal portion 306 may also include an actuation module 210. In an aspect, the secure buffer 339 may include or share a memory with the secure buffer 316.

The privileged-secure portion 308 may include a monitor module 344, a secure operation system or trusted execution environment module 346, and a secure services library module 348. In an aspect, the privileged-secure portion 308 may also include a secure buffer for display 330.

In an aspect, the mobile device 102 may further include a secure file system (not illustrated) suitable for long term and secured storage of data and behavior models. In an aspect, the secure file system may be configured to store longer term data in encrypted form. In an aspect, the secure file system may be configured to store behavior model that are updated infrequently.

In an aspect, the mobile device 102 may further include a secure communication link (not illustrated in FIG. 3A) suitable for communicating with a network server 116 and/or a component in a cloud service or network 118. The secure communication link may be configured to support sending and receiving behavior models to and from an external server 116, 118, which may be achieved in the unprivileged-secure portion 304 via the partner services module 324. For example, the secure VPN module 326 may receive encrypted behavior models from a network server 116, the encryption/decryption module 328 may decrypt the received behavior models in the unprivileged-secure portion 304 and send the decrypted behavior models to the client module 208 in the unprivileged-normal portion 302.

The application framework 312, runtime libraries 314, kernel APIs 336, and drivers 338 may each include an instrumented API 311, which may be used by the behavior observer module 202 to collect behavior information from each respective module 312, 314, 336, 338. Further, since these module 312, 314, 338, and 202 are situated in the normal portions of the secure system, behavior information may be sent from components in the unprivileged-normal portion 302 to the behavior observer module 202 in the privileged-normal portion 306 with minimal latency and without consuming a significant amount of the processing and battery resources of the mobile device. In addition, by situating the behavior observer module 202 in the privileged-normal portion 306 (as opposed to the unprivileged portion 302), the behavior observer module 202 is protected from unauthorized access by user-level software applications 310, which may be malicious, buggy or otherwise contribute to the performance degradation of the mobile device.

Figure 3B:
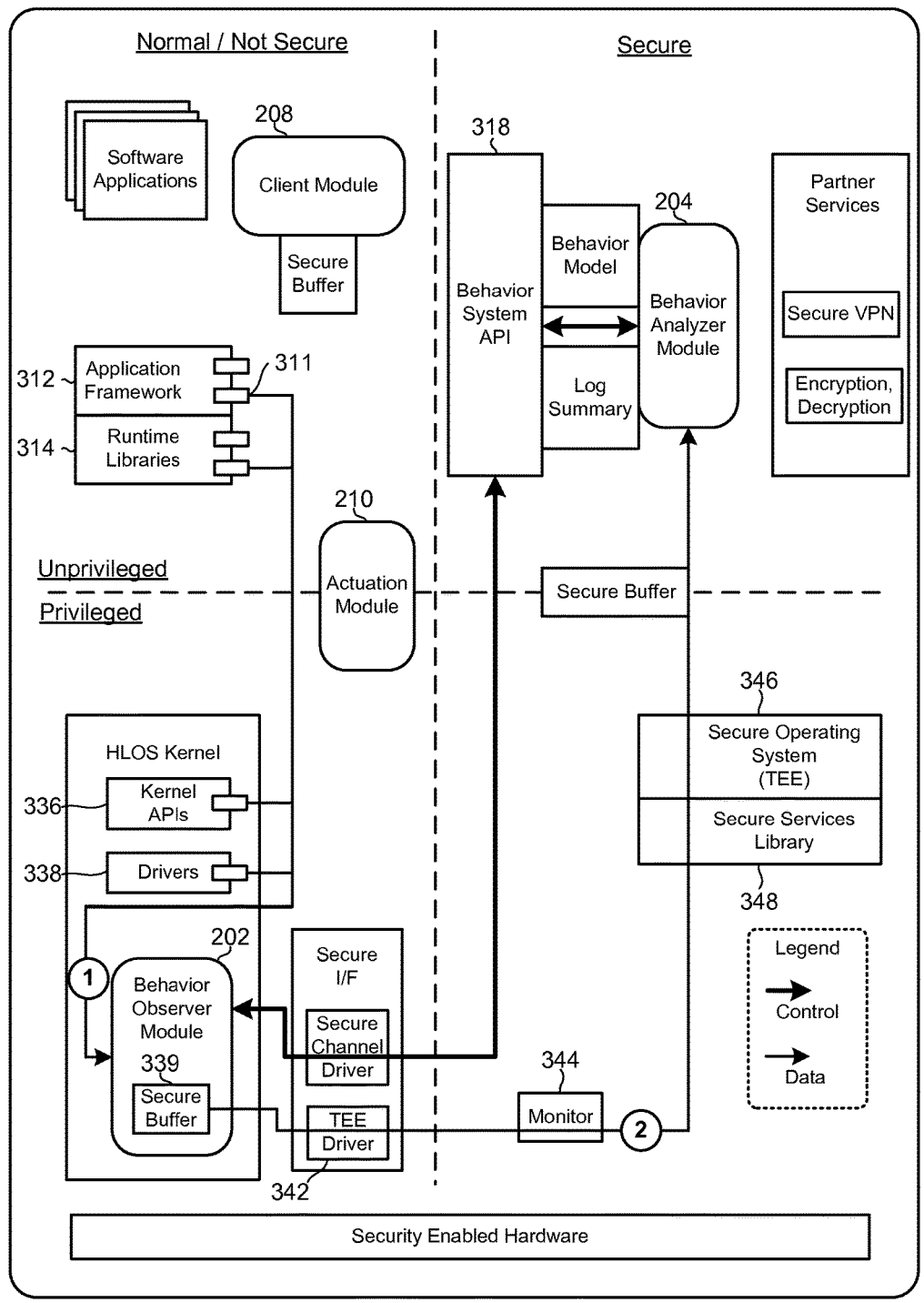

FIG. 3B illustrates example logical components and information flows (e.g., data and control information) in an aspect mobile device 102 configured to detect malware. In operation 1, the behavior observer module 202 may collect behavior information from various modules 312, 314, 336, 338 situated in the unprivileged-normal portion 302 and the privileged-normal portion 306 via the instrumented APIs 311. For example, the behavior observer module 202 may collect information pertaining to the observed operations/events, intelligently filter the collected information, generate one or more observations based on the filtered information, and store the generated observations in the secure buffer module 339 as a concise behavior vector. In operation 2, the mobile device may send (e.g., via memory read/writes, function calls, etc.) the concise behavior vector to the behavior analyzer module 204 in the secure-unprivileged portion 304, which may be achieved via the trusted execution environment driver module 342, the monitor module 344, secure services library 348, and secure operations system 346. By sending only the concise behavior vector across the secure protection boundary (i.e., from the privileged-normal portion 306 to the unprivileged-secure portion 306), the various aspects reduce the amount of processing and battery resources consumed by the mobile device without compromising performance.

The behavior analyzer module 204 may analyze and/or classify the collected behavior information and determine whether a particular mobile device behavior, software application, or process is benign, suspicious, malicious, or performance-degrading. The analyzer module 204 may send feedback to the behavior observer module 202 via the behavior system API 318.

Figure 3C:
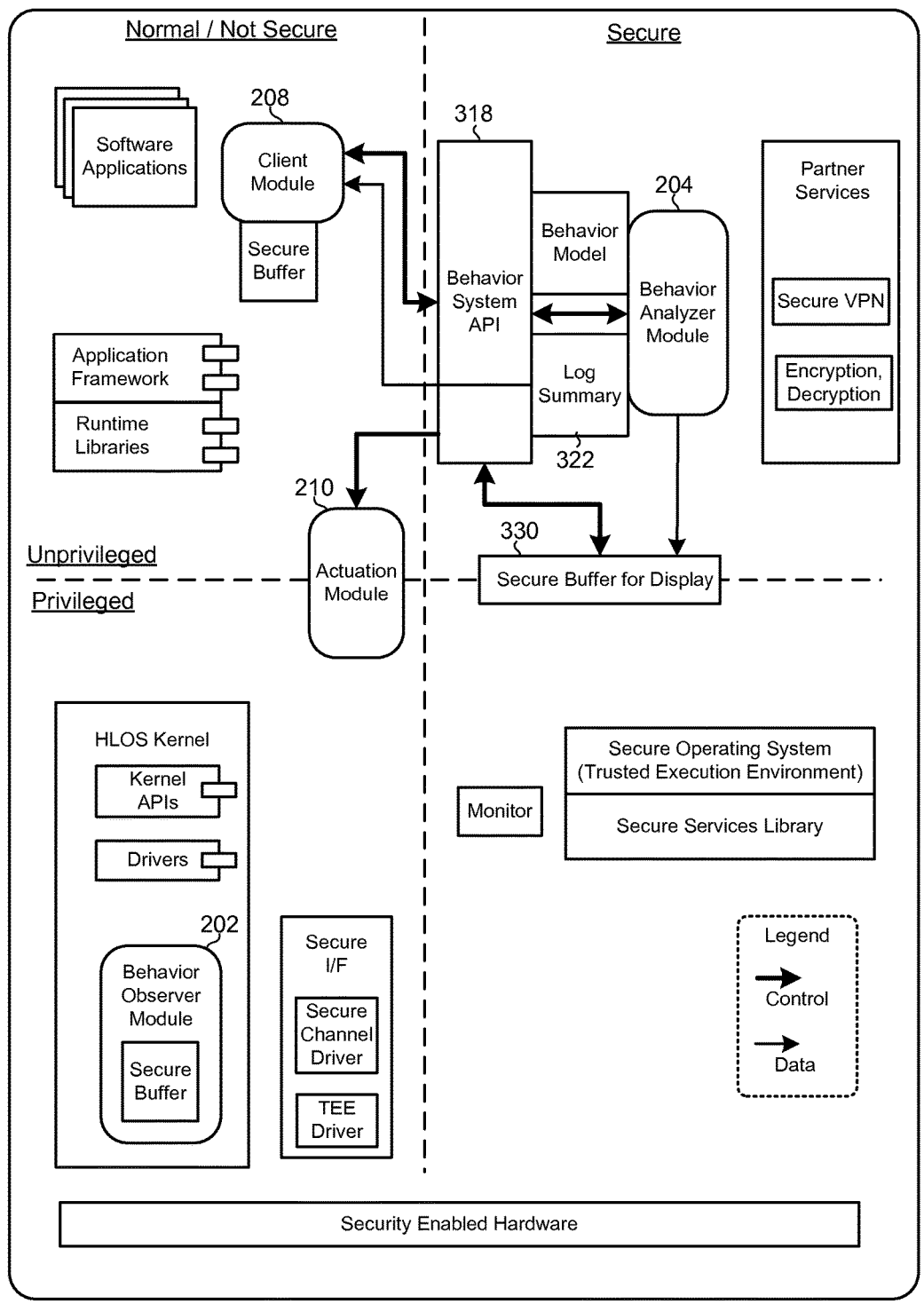

FIG. 3C illustrates example logical components and information flows in an aspect mobile device 102 configured to heal, cure, isolate, or otherwise fix mobile device behaviors determined to be malicious or performance-degrading. Specifically, FIG. 3C illustrates that the behavior analyzer module 204 may communicate with an actuation module 210 and/or the client module 208 via the behavior system API module 318. For example, if the analyzer module 204 determines that a behavior, software application, or process is malicious or performance-degrading, the analyzer module 204 may notify the actuator module 210, which may perform various actions or operations to correct mobile device behaviors determined to be malicious or performance-degrading and/or perform operations to heal, cure, isolate, or otherwise fix the identified problem.

As another example, if the behavior analyzer module 204 determines that a behavior, software application, or process is suspicious, the behavior analyzer module 204 may notify the client module 208, which may format and send behavior information (e.g., information received from the log summary module 322) to the network server 116 and/or a component in a cloud service or network 118 for further analysis and use in generating future models.

In an aspect, the behavior analyzer module 204 may be configured to communicate directly and securely with a user of the mobile device by writing information to the secure buffer for display 330, thereby bypassing the traditional user interface for rendering output on the electronic display. Thus, if a malicious application or process infiltrates the system and takes control of the mobile device display, user interface, or display subsystem, the behavior analyzer module 204 may still notify the user of the presence or existence of the malicious application.

Figure 3D:
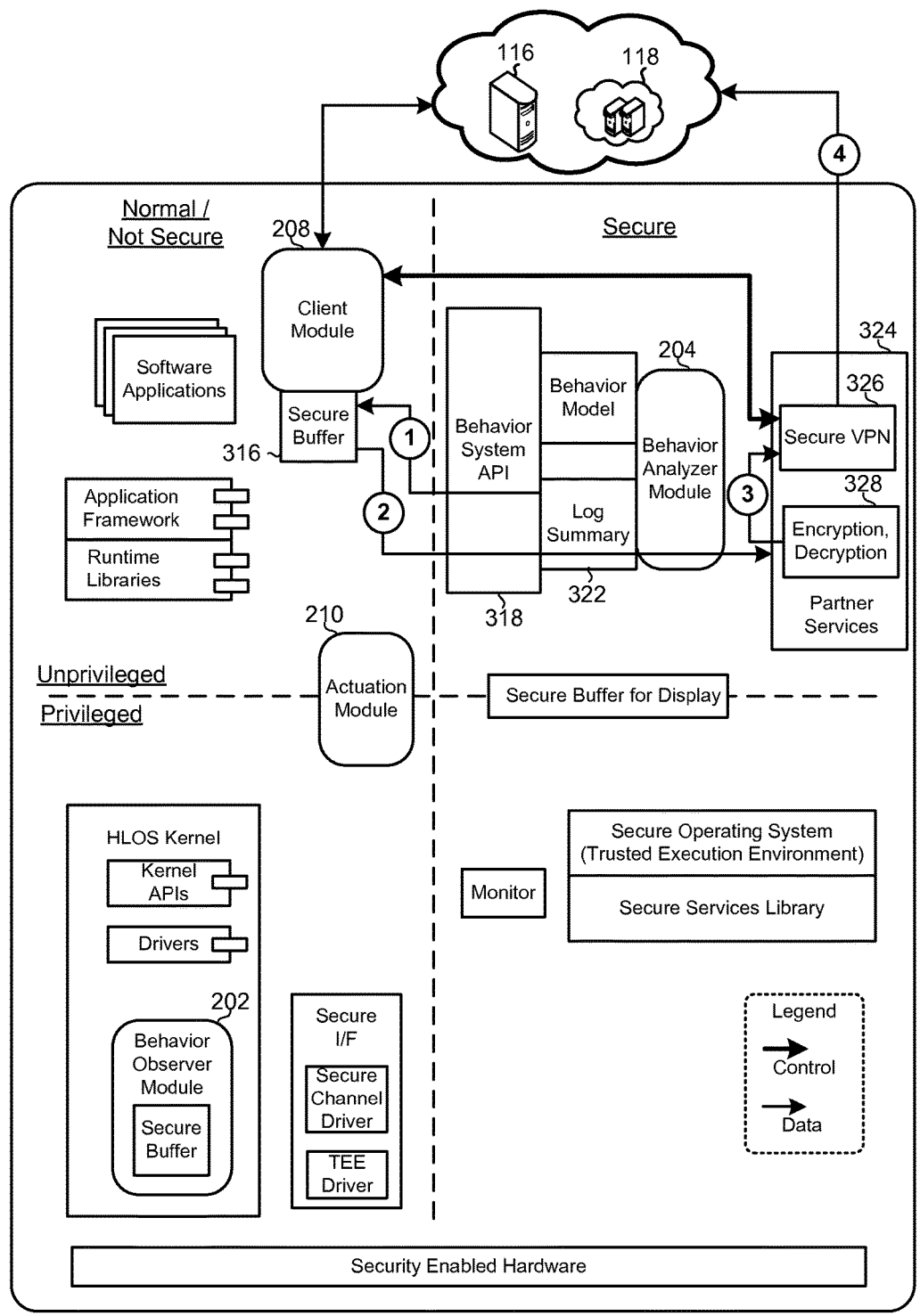

FIG. 3D illustrates example logical components and information flows in an aspect mobile device 102 configured to send behavior information collected on the mobile device to a network server 116 and/or a component in a cloud service or network 118. In operation 1, the behavior analyzer module 204 may perform analysis operations and store the results of its analysis in the log summary module 322, which may process and store the analysis results in the secure buffer 316 via the behavior system API module 318. In operation 2, the partner services module 324 may read the analysis results from the buffer 316. In operation 3, the partner services module 324 may encrypt the analysis results and send the encrypted information to the secure VPN module 326. In operation 4, the secure VPN module 326 may transmit the analysis results to a network server 116 and/or a component in a cloud service or network 118. The encryption and VPN modules provide a further layer of privacy and security while transmitting sensitive behavioral data over the network.

In an aspect, the behavior analyzer module 204 may be configured to notify the client module 208 when it determines that a mobile device behavior is suspicious, and the client module 208 may initiate the processes of encrypting, formatting and sending behavior information (e.g., information received from the log summary module 322) to the network server 116 and/or a component in a cloud service or network 118 for further analysis.

Figure 3E:
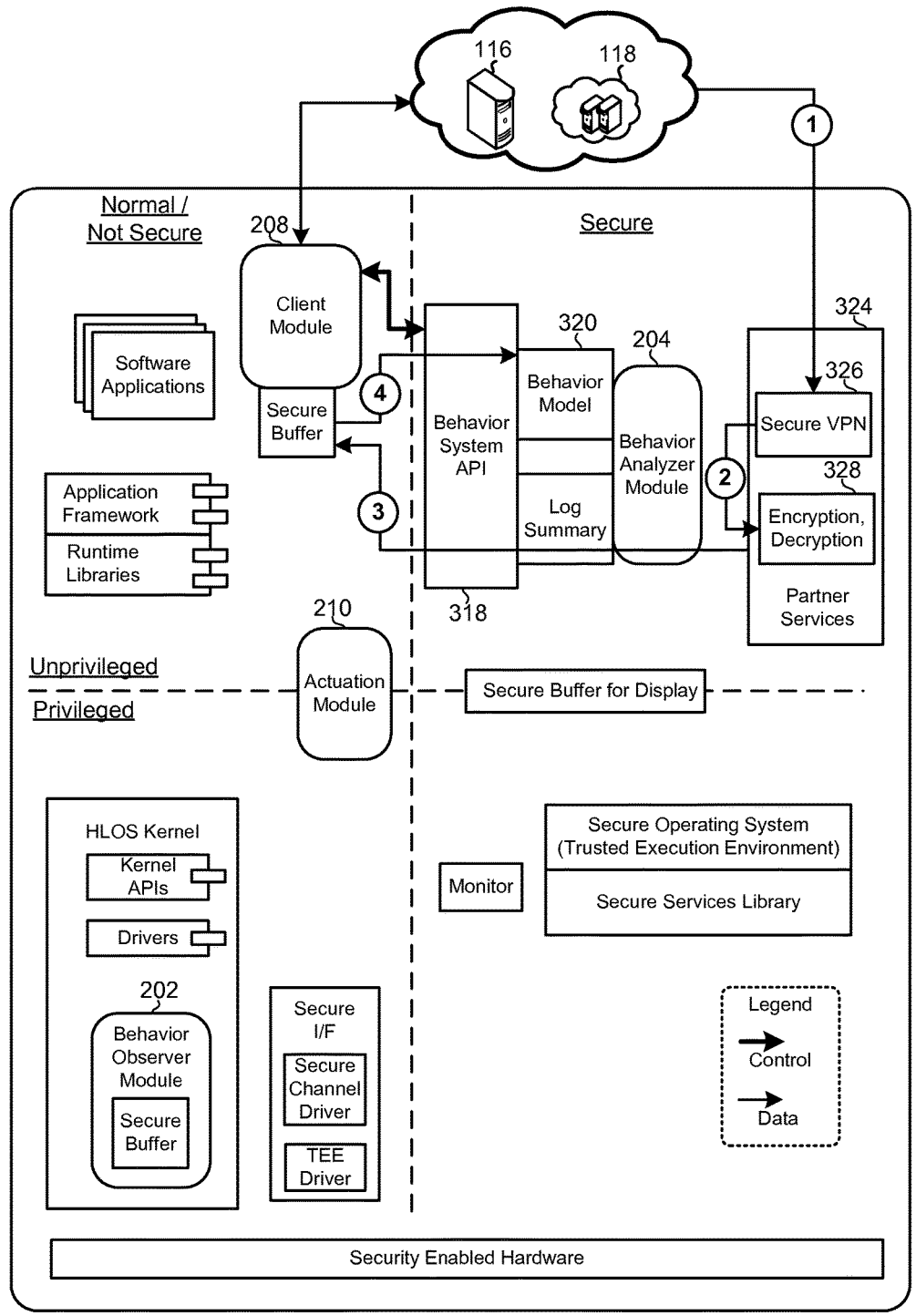

FIG. 3E illustrates example logical components and information flows in an aspect mobile device 102 configured to receive data or behavior models from a network server. In operation 1, the secure VPN module 326 may receive encrypted data/behavior models from a network server 116 and/or a component in a cloud service or network 118. In operation 2, the decryption module 328 may decrypt the information. In operation 3, the partner services module may store the received information in a secure buffer 316. The client module 208 may send control information to the behavior analyzer module 204 via the behavior system API. In operation 4, the behavior model module may generate or update data or behavior modules suitable for use in determining whether a mobile device behavior is benign or not benign.

Figure 4:
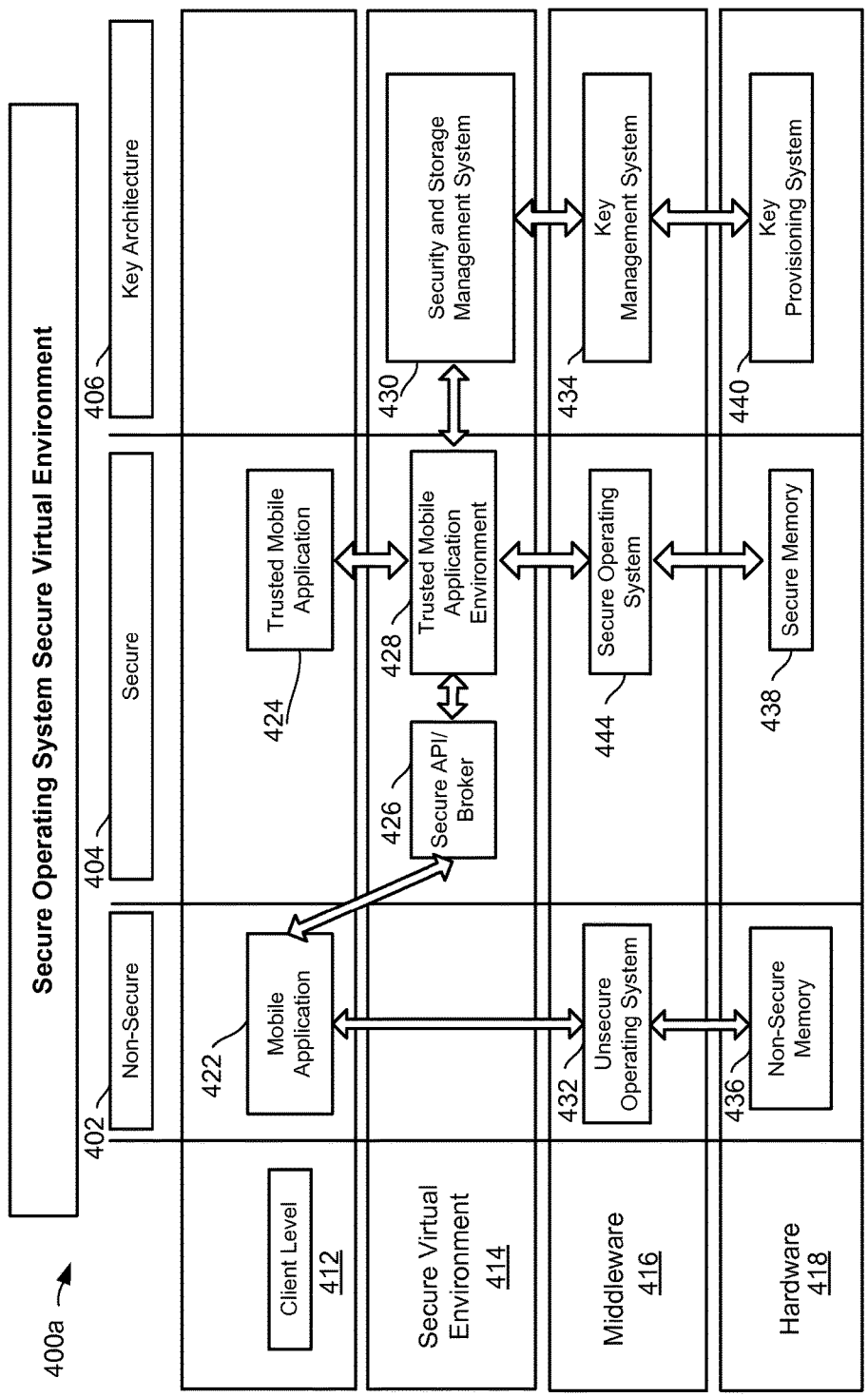
FIGS. 4-9 are system block diagrams of example trusted execution environments suitable for use with the various aspects.

FIGS. 4-9 illustrate example logical components and information flows in a secure computing environment suitable for implementing the various aspects. Referring to FIG. 4, the overall system architecture 400a includes three areas; a non-secure area 402, a secure area 404, and a key architecture 406. The non-secure area 402 represents unprotected areas in which security protocols are not applied, the secure area 404 represents protected areas in which security protocols are applied, and the key architecture area 406 represents the areas in which mobile device security keys operate.

The software levels of the system 400a may be broken down into a client level 412, a secure virtual environment 414, a middleware level 416, and a hardware level 418. Client level 412 software may include general mobile device software applications 422 and trusted mobile applications 424, which may be pre-authorized software provided by a third party or which is identified as complying with specific security and/or operability requirements.

The secure virtual area 414 may be a software level or run time environment established on a mobile device. The secure virtual area 414 may be established using a single application or a group of applications. The secure virtual environment 414 may contain a secure broker 426 that acts as a gate keeper for the secure virtual environment 414 and controls the operation of data and mobile applications 422 received from the non-secure area 402.

The secure broker 426 may allow application designers to create mobile applications 422 that can operate in the secure virtual environment 414. In this manner, application designers need not interact with the third party entity directly to produce or provide applications to mobile devices. That is, an application designer may create a mobile application 422 that meets the security requirements of the secure virtual environment 414 independent of the corporate entity.

A mobile device user may attempt to download or access the mobile application 422 stored in a non-secure area. In response the secure broker 426 may determine if the mobile application 422 meets the security and operability requirements for the specific secure virtual environment 414 established on the mobile device. Should the mobile application 422 meet the security and operability requirements the mobile application 422 may be allowed to operate in the secure virtual environment 414 and be provided to the trusted mobile application environment 428. The trusted mobile application environment 428 may be an area of the secure virtual environment 414, including a GUI, in which the authorized applications operate. Should the mobile application 422 not meet the requirements of the secure broker 426, the mobile application 422 may be restricted from further interactions with the secure virtual environment 414.

Additionally the secure virtual environment 414 may include a security and storage management system 430 that interacts with the trusted mobile application environment 428 and the key management system 434 to provide necessary security and storage capability.

An unsecure operating system 432 may be provided on the mobile device in a non-secure area 402 and a non-secure memory 436 may be provided in a non-secure area 402. A mobile application 422 that does not meet the requirements of the secure broker 426 may only operate in the unsecure operating system 432 and may only write or read data to the non-secure memory 436.

Provided in the secure area 404 of the mobile device may be a secure operating system 444 and a secure memory 438. Trusted mobile applications 424 may be provided to the trusted mobile application environment 428. Trusted mobile applications 424, or mobile applications 422 that meet the requirements of the secure broker 426, may be provided to the secure operating system 444 through the trusted mobile application environment 428. Only applications in the trusted mobile application environment 428 interact with the secure operating system 444 and the secure memory 438. In the aspect illustrated in FIG. 4 the non-secure memory 436, the secure memory 438 and the key provisioning system 440 reside at the hardware level 418.

Figure 5:
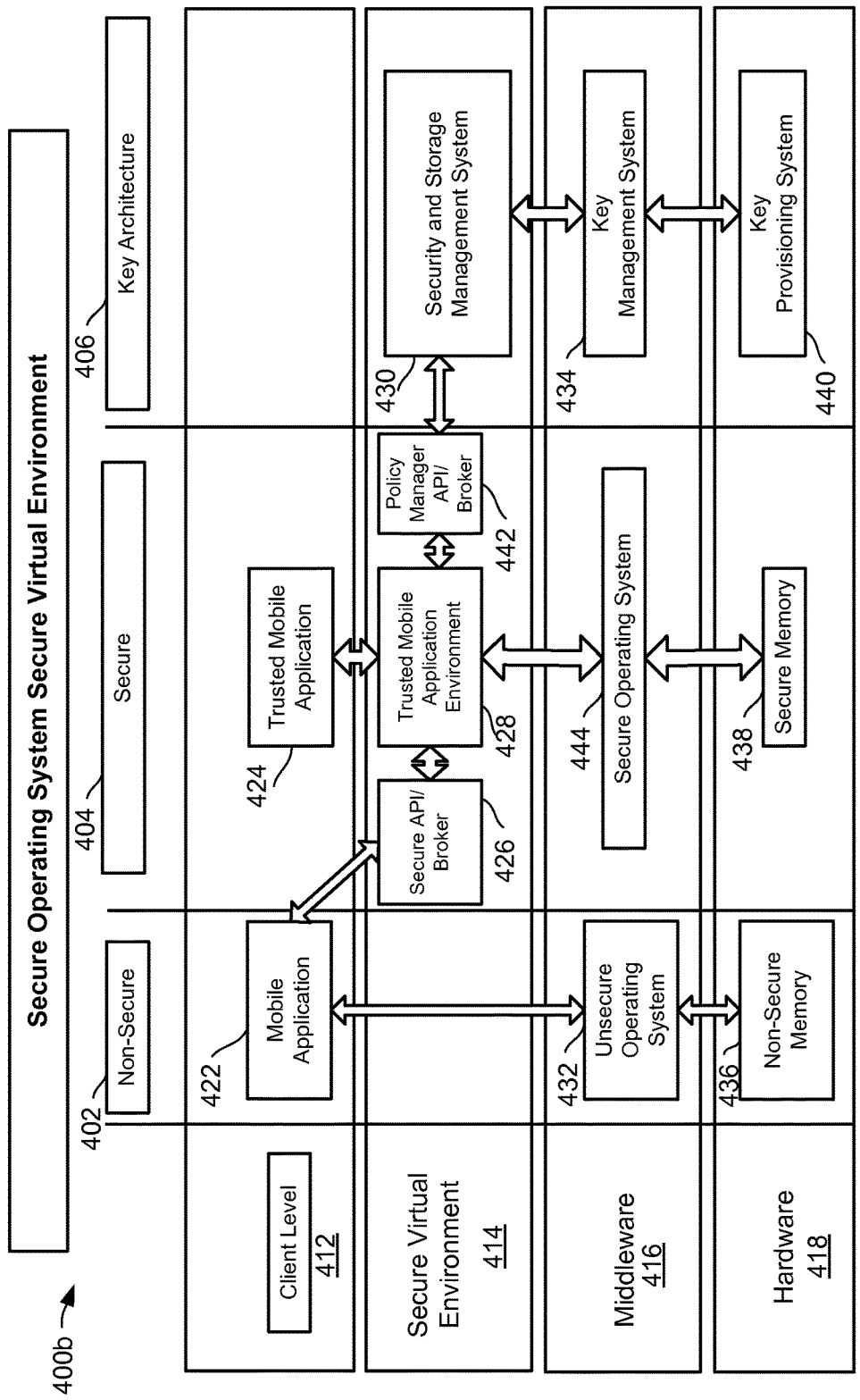

FIG. 5 illustrates another aspect system architecture 400b that is similar to those described above with reference to FIG. 4, with the addition of a policy manager broker 442 in the secure virtual environment. The policy manager broker 442 may be in communication with the security and storage management system 430 and the trusted mobile application environment 428. Through either the trusted mobile application environment 428, or the security and storage management system 430, the policy manager broker 442 may receive corporate policy updates from the corporate entity.

The policy manager broker 442 may enable the corporate entity to update security protocols, update operating restrictions, and perform various functions in the secure virtual environment 414 and the secure area 404 of the mobile device. The policy manager broker 442 gives the corporate entity the ability to remotely update and control the secure virtual environment 414 and secure area 404 of the mobile device.

Figure 6:
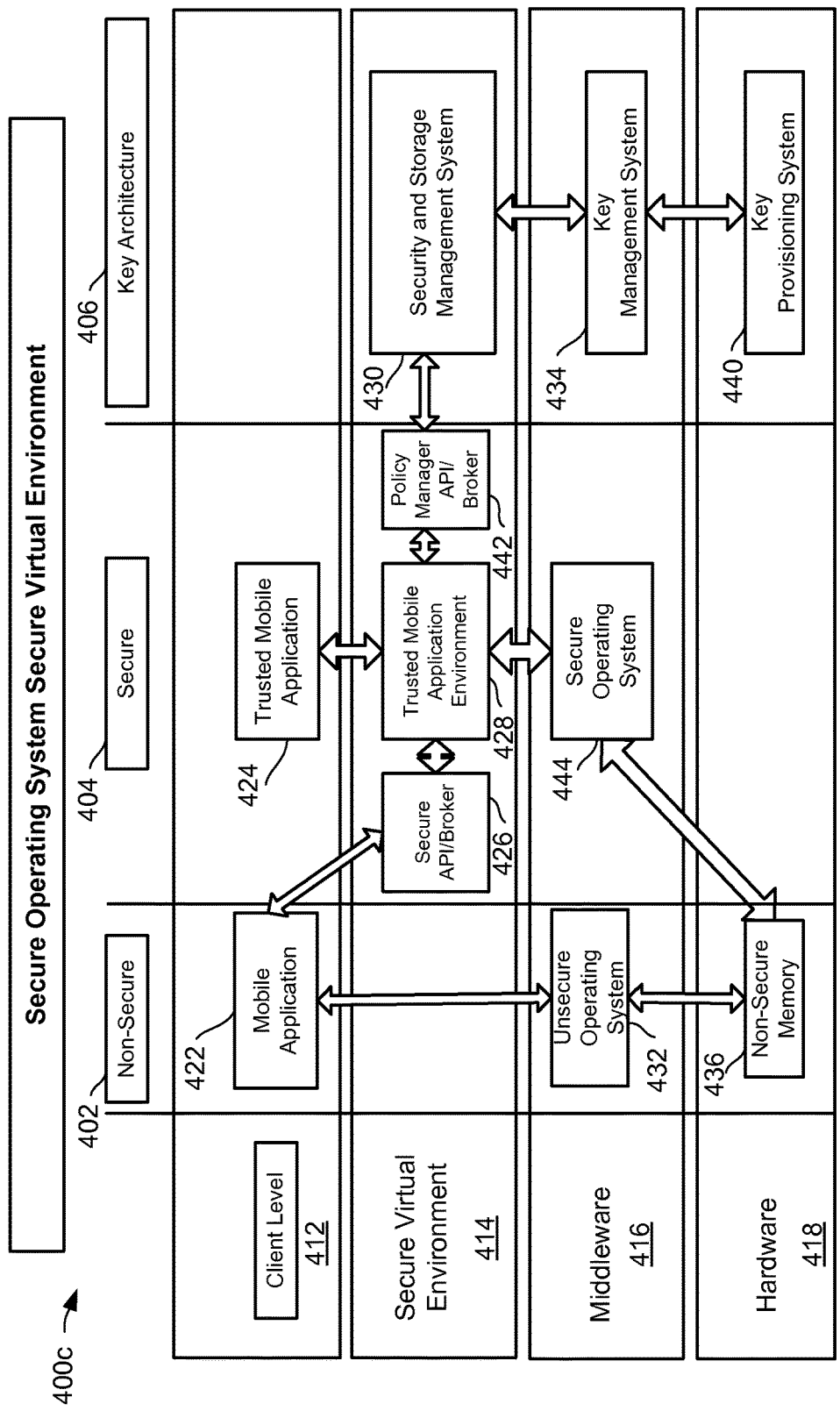

FIG. 6 illustrates another aspect architecture 400c that includes modules similar to those described above with respect to FIG. 5, including the policy manger broker 442, but with a single memory 436 on the mobile device. In this aspect, the secure operating system 444 and the unsecure operating system 432 both store and read data on the non-secure memory 436. Data in the secure virtual environment 414 may be stored in an encrypted form when not in use by the trusted mobile application environment 428. The continual application of encryption at the data level by the secure virtual environment 414 ensures that secure data may be stored in a non-secure memory 436 because the secure data itself will be encrypted at the data level.

Figure 7:
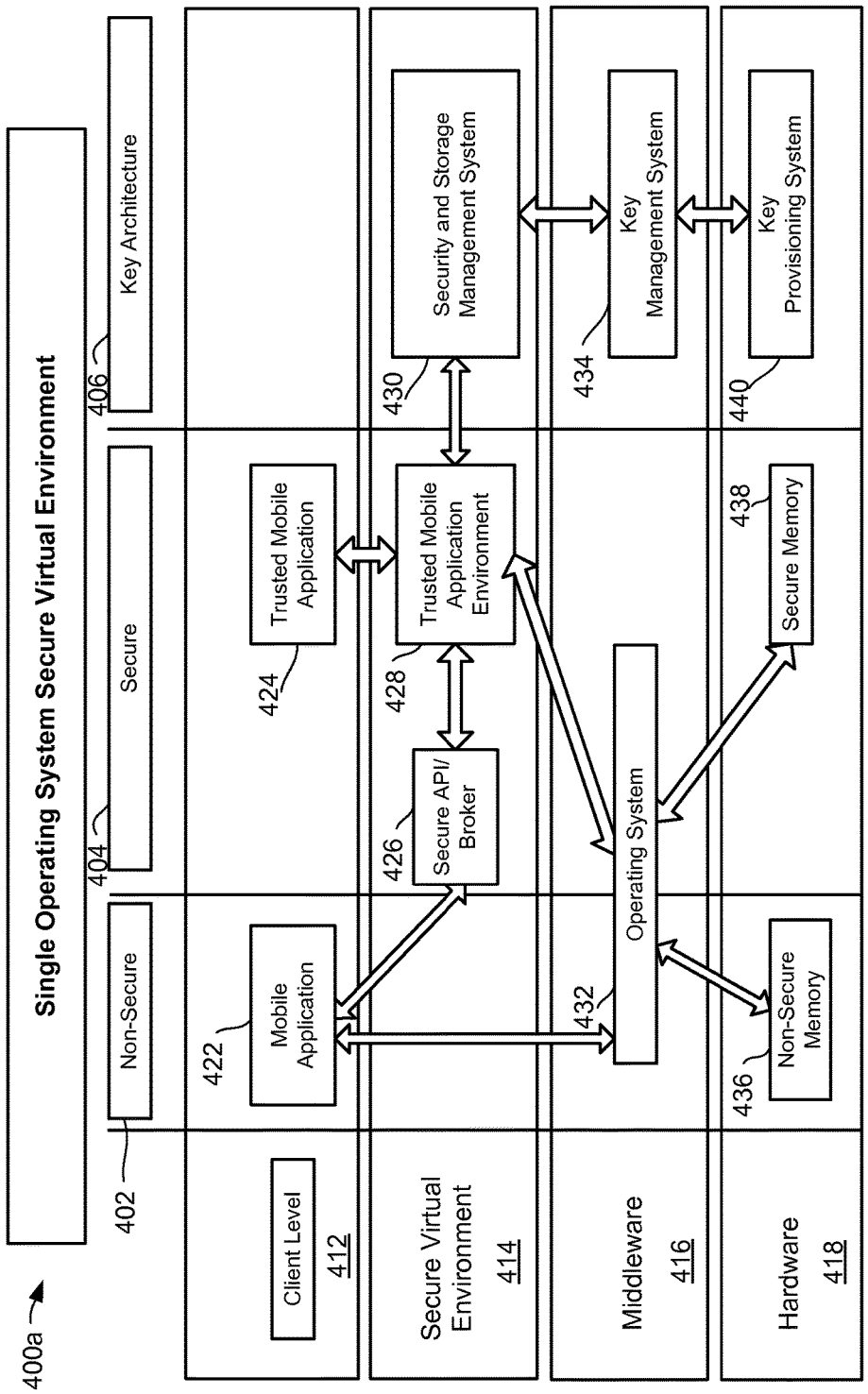
Figure 8:
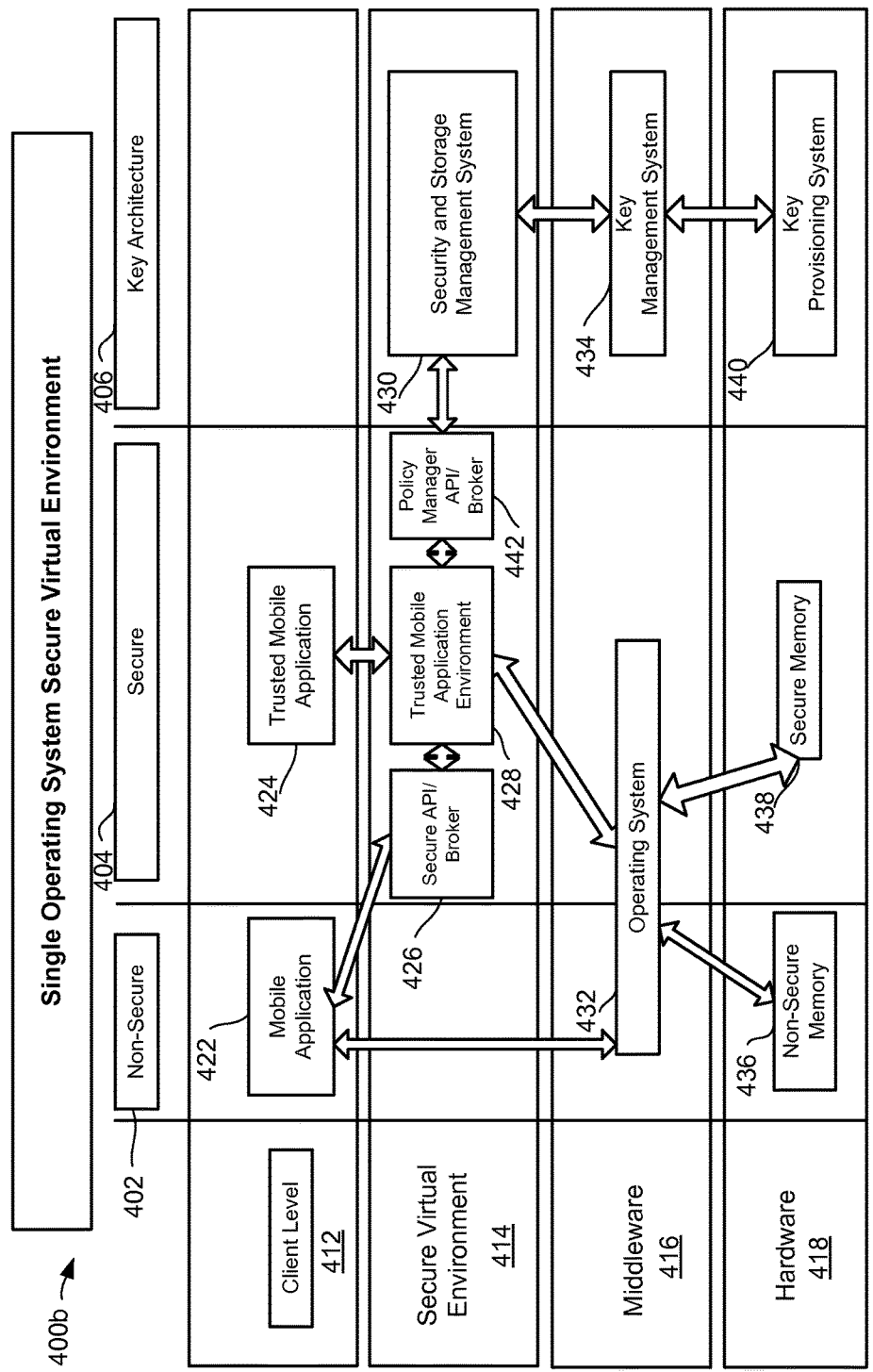
Figure 9:
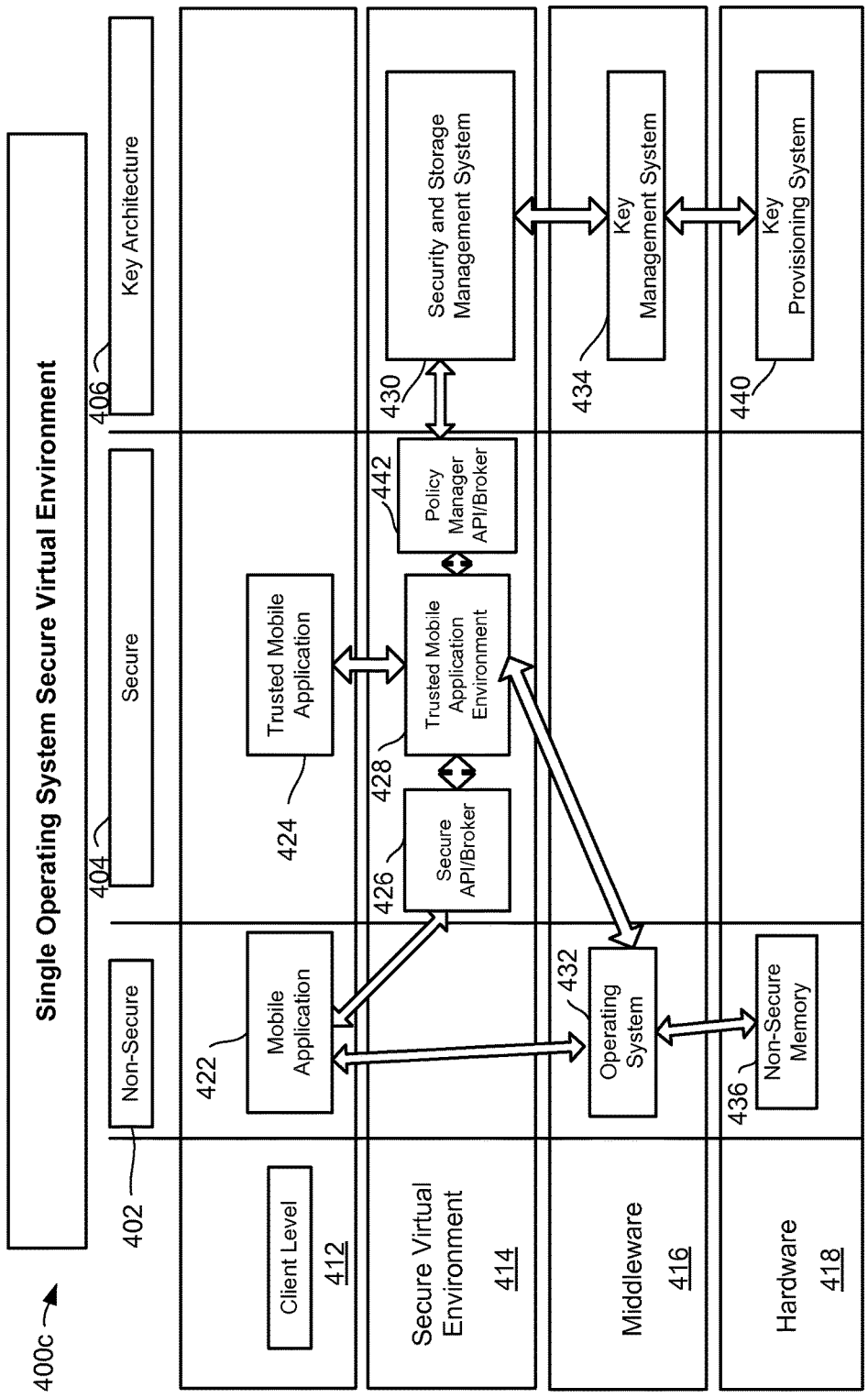

FIGS. 7-9 illustrate alternative aspects of a secure virtual environment in which a mobile device is configured with a single operating system. Referring to FIG. 7, the overall system architecture 400a may include three areas; a non-secure area 402, a secure area 404, and a key architecture 406. The non-secure area 402 represents unprotected areas in which security protocols are not applied. The secure area 404 represents protected areas in which security protocols are applied. The key architecture 406 represents the areas in which mobile device security keys operate.

The software levels of the system 400a may be broken down into a client level 412, a secure virtual environment 414, a middleware level 416, and a hardware level 418.

Similar to the aspects discussed above, the client level 412 software includes mobile, or standard, applications 422 and trusted mobile applications 424, also called simply trusted applications. Trusted mobile applications 424 may be applications specifically provided by the corporate entity that may be identified as meeting security requirements and authorized to handle corporate entity data and to operate on the corporate entity's networks and equipment. Trusted mobile applications 424 may be specific applications designed for the corporate entity or public applications that the corporate entity has previously established as meeting security requirements and operability requirements.

Similar to the aspects discussed above, the secure virtual area 414 may be a software level or run time environment established on a mobile device. The secure virtual area 414 may be established using a single application or a group of applications. The secure virtual environment 414 may contain a secure broker 426 that acts as a gate keeper for the secure virtual environment 414 and controls the operation of data and mobile applications 422 received from the non-secure area 402.

Similar to the aspects discussed above, the secure broker 426 may allow application designers to create mobile applications 422 that can operate in the secure virtual environment 414. In this manner, application designers need not interact with the corporate entity directly to produce applications, and provide applications to mobile devices. An application designer may create a mobile application 422 that meets the security requirements of the secure virtual environment 414 independent of the corporate entity.

Similar to the aspects discussed above, a mobile device user may attempt to download or access the mobile application 422 stored in a non-secure area. In response, the secure broker 426 may determine if the mobile application 422 meets the security and operability requirements for the specific secure virtual environment 414 established on the mobile device. Should the mobile application 422 meet the security and operability requirements the mobile application 422 may be allowed to operate in the secure virtual environment 414 and be provided to the trusted mobile application environment 428. The trusted mobile application environment 428 may be an area of the secure virtual environment 414, including a GUI, in which the authorized applications operate. Should the mobile application 422 not meet the requirements of the secure broker 426, the mobile application 422 may not be allowed to interact further with the secure virtual environment 414.

Additionally the secure virtual environment may include a security and storage management system 430 that interacts with the trusted mobile application environment 428 and the key management system 434 to provide necessary security and storage capability.

An operating system 432 may be provided on the mobile device in both a non-secure area 402 and a secure area 404. The single operating system 432 interacts with the secure virtual environment 432 through the trusted mobile application environment 428 and mobile applications 422 in a non-secure area 402. The operating system 432 may be configured such that a mobile application 422 that does not meet the requirements of the secure broker 426 may only function in a non-secure area 402 of the operating system 432 and may only write or read data to the non-secure memory 436. The operating system 432 may also operate in the secure area 404 of the mobile device and read and write data to a secure memory 438.

Trusted mobile applications 424 may be provided to the trusted mobile application environment 428. Either trusted mobile applications 424, or mobile applications 422 that meet the requirements of the secure broker 426, may be provided to the operating system 444 through the trusted mobile application environment 428. Only applications in the trusted mobile application environment 428 interact with the secure memory 438 through the operating system 432. In the aspect illustrated in FIG. 7 the non-secure memory 436, the secure memory 438 and the key provisioning system 440 reside at the hardware level 418.

FIG. 8 illustrates another aspect system architecture 400b that includes modules similar to those described above with reference to FIG. 7, with the addition of a policy manager broker 442 in the secure virtual environment. The policy manager broker 442 may be in communication with the security and storage management system 430 and the trusted mobile application environment 428. Through either the trusted mobile application environment 428, or the security and storage management system 430, the policy manager broker 442 may receive corporate policy updates from the corporate entity.

The policy manager broker 442 may enable the corporate entity to update security protocols, update operating restrictions, and perform various functions in the secure virtual environment 414 and the secure area 404 of the mobile device. The policy manager broker 442 gives the corporate entity the ability to remotely update and control the secure virtual environment 414 and secure area 404 of the mobile device.

FIG. 9 illustrates another aspect of the system architecture 400c that includes modules similar to those described above with respect to FIG. 8, but with a single memory 436 on the mobile device. Additionally, in this aspect the operating system 432 resides entirely in the non-secure area 402. In this aspect data from the trusted mobile application environment 428 and all other data passes to a single non-secure memory 436. All data in the secure virtual environment 414 may be stored in an encrypted form when not in use by the trusted mobile application environment 428. The continual application of encryption at the data level by the secure virtual environment 414 ensures that secure data may be stored in a non-secure memory 436 because the secure data itself will be encrypted at the data level.

Figure 10:
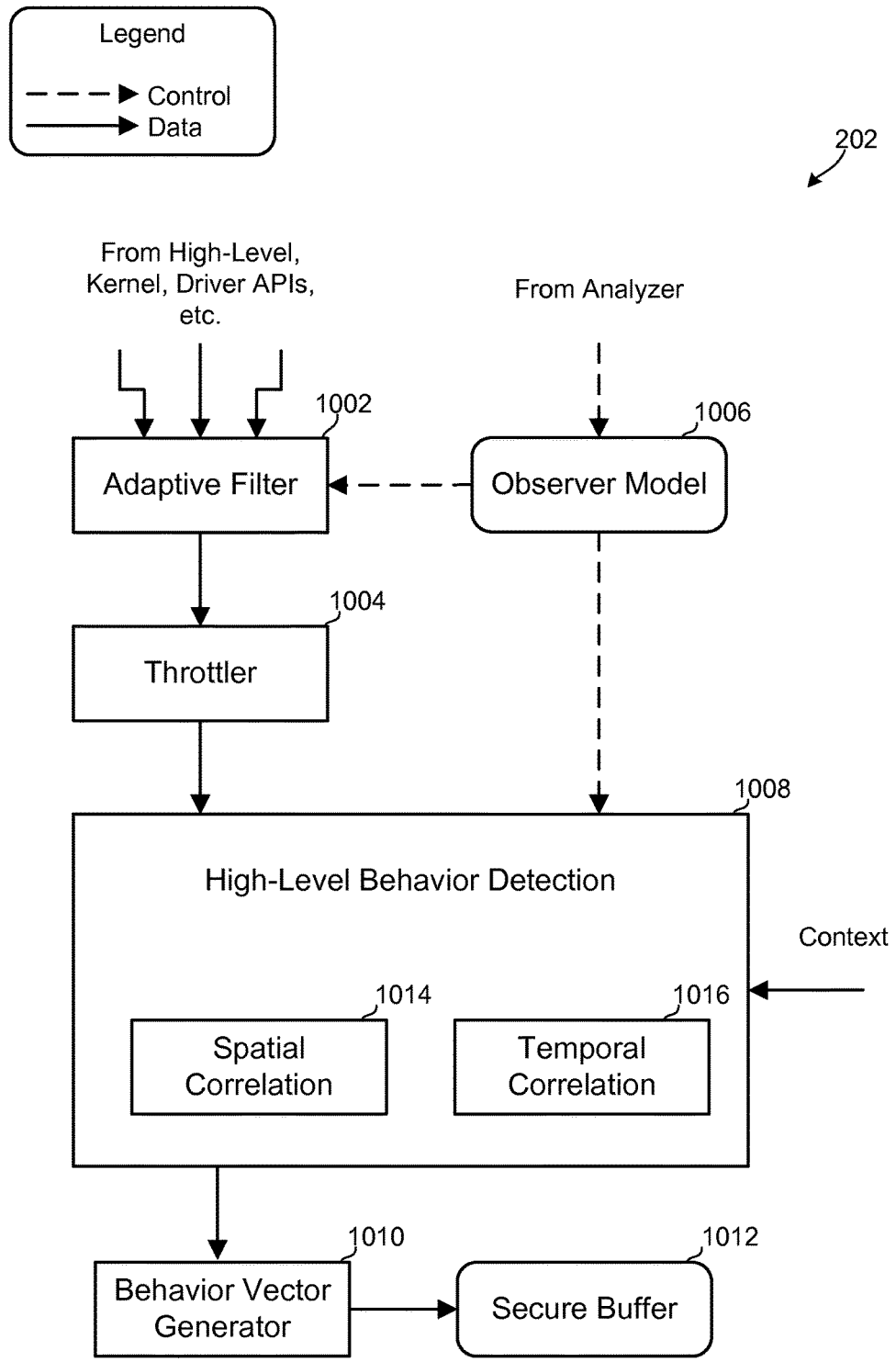
FIG. 10 is a block diagram illustrating example logical components and information flows in an observer module configured to perform dynamic and adaptive observations in accordance with an aspect.

FIG. 10 illustrates example logical components and information flows in an observer module 202 of a computing system configured to perform dynamic and adaptive observations in accordance with an aspect. The observer module 202 may include an adaptive filter module 1002, a throttle module 1004, an observer mode module 1006, a high-level behavior detection module 1008, a behavior vector generator 1010, and a secure buffer 1012. The high-level behavior detection module 1008 may include a spatial correlation module 1014 and a temporal correlation module 1016.

The observer mode module 1006 may receive control information from various sources, which may include an analyzer unit (e.g., the analyzer module 204 described above with reference to FIG. 2) and/or an application API. The observer mode module 1006 may send control information pertaining to various observer modes to the adaptive filter module 1002 and the high-level behavior detection module 1008.

The adaptive filter module 1002 may receive data/information from multiple sources, and intelligently filter the received information to generate a smaller subset of information selected from the received information. This filter may be adapted based on information or control received from the analyzer module, or a higher-level process communicating through an API. The filtered information may be sent to the throttle module 1004, which may be responsible for controlling the amount of information flowing from the filter to ensure that the high-level behavior detection module 1008 does not become flooded or overloaded with requests or information.

The high-level behavior detection module 1008 may receive data/information from the throttle module 1004, control information from the observer mode module 1006, and context information from other components of the mobile device. The high-level behavior detection module 1008 may use the received information to perform spatial and temporal correlations to detect or identify high level behaviors that may cause the device to perform at sub-optimal levels. The results of the spatial and temporal correlations may be sent to the behavior vector generator 1010, which may receive the correlation information and generate a behavior vector that describes the behaviors of particular process, application, or sub-system. In an aspect, the behavior vector generator 1010 may generate the behavior vector such that each high-level behavior of a particular process, application, or sub-system is an element of the behavior vector. In an aspect, the generated behavior vector may be stored in a secure buffer 1012. Examples of high-level behavior detection may include detection of the existence of a particular event, the amount or frequency of another event, the relationship between multiple events, the order in which events occur, time differences between the occurrence of certain events, etc.

In the various aspects, the observer module 202 may perform adaptive observations and control the observation granularity. That is, the observer module 202 may dynamically identify the relevant behaviors that are to be observed, and dynamically determine the level of detail at which the identified behaviors are to be observed. In this manner, the observer module 202 enables the system to monitor the behaviors of the mobile device at various levels (e.g., multiple coarse and fine levels). The observer module 202 may enable the system to adapt to what is being observed. The observer module 202 may enable the system to dynamically change the factors/behaviors being observed based on a focused subset of information, which may be obtained from a wide verity of sources.

As discussed above, the observer module 202 may perform adaptive observation techniques and control the observation granularity based on information received from a variety of sources. For example, the high-level behavior detection module 1008 may receive information from the throttle module 1004, the observer mode module 1006, and context information received from other components (e.g., sensors) of the mobile device. As an example, a high-level behavior detection module 1008 performing temporal correlations might detect that a camera has been used and that the mobile device is attempting to upload the picture to a server. The high-level behavior detection module 1008 may also perform spatial correlations to determine whether an application on the mobile device took the picture while the device was holstered and attached to the user's belt. The high-level behavior detection module 1008 may determine whether this detected high-level behavior (e.g., usage of the camera while holstered) is a behavior that is acceptable or common, which may be achieved by comparing the current behavior with past behaviors of the mobile device and/or accessing information collected from a plurality of devices (e.g., information received from a crowd-sourcing server). Since taking pictures and uploading them to a server while holstered is an unusual behavior (as may be determined from observed normal behaviors in the context of being holstered), in this situation the high-level behavior detection module 1008 may recognize this as a potentially threatening behavior and initiate an appropriate response (e.g., shutting off the camera, sounding an alarm, etc.).

In an aspect, the observer module 202 may be implemented in multiple parts.

Figure 11:
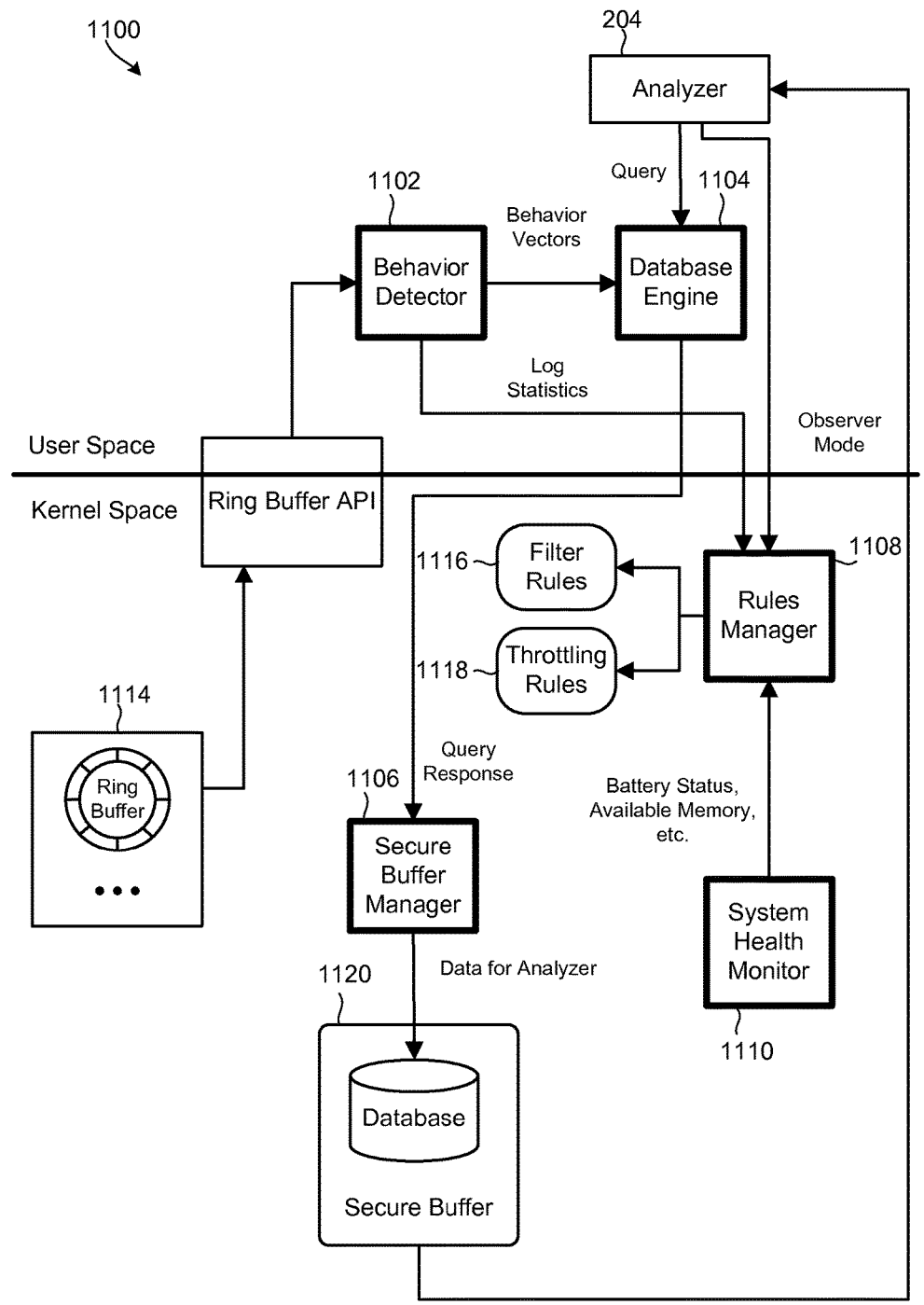
FIG. 11 is a block diagram illustrating logical components and information flows in a computing system implementing observer daemons in accordance with another aspect.

FIG. 11 illustrates logical components and information flows in a computing system 1100 implementing an aspect observer daemon. In the example illustrated in FIG. 11, the computing system 1100 includes a behavior detector 1102 module, a database engine 1104 module, and an analyzer module 204 in the user space, and a ring buffer 1114, a filter rules 1116 module, a throttling rules 1118 module, and a secure buffer 1120 in the kernel space. The computing system 1100 may further include an observer daemon that includes the behavior detector 1102 and the database engine 1104 in the user space, and the secure buffer manager 1106, the rules manager 1108, and the system health monitor 1110 in the kernel space.

The various aspects may provide cross-layer observations on mobile devices encompassing webkit, SDK, NDK, kernel, drivers, and hardware in order to characterize system behavior. The behavior observations may be made in real time.

The observer module may perform adaptive observation techniques and control the observation granularity. As discussed above, there are a large number (i.e., thousands) of factors that could contribute to the mobile device's degradation, and it may not be feasible to monitor/observe all of the different factors that may contribute to the degradation of the device's performance. To overcome this, the various aspects dynamically identify the relevant behaviors that are to be observed, and dynamically determine the level of detail at which the identified behaviors are to be observed.

Figure 12A:
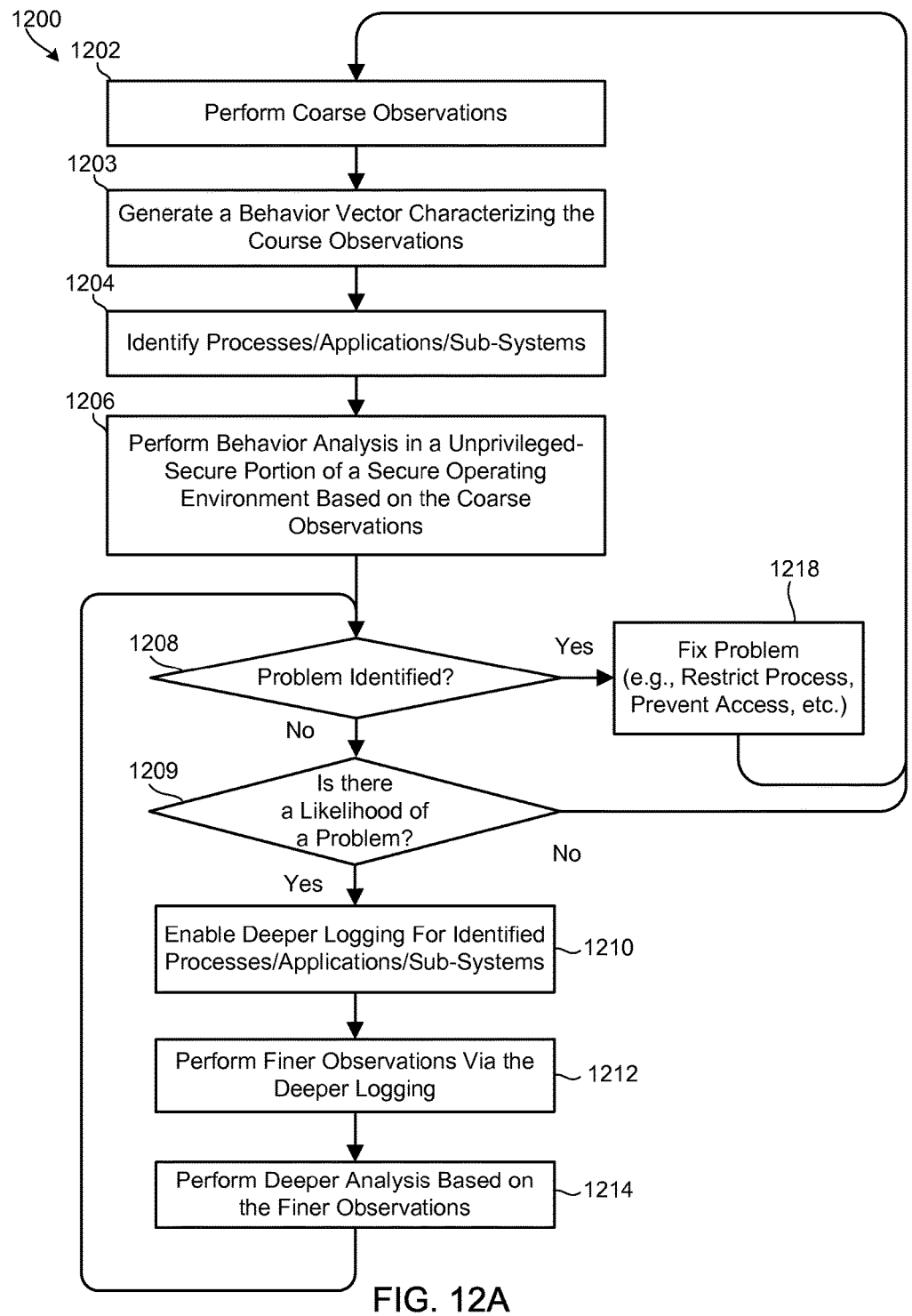
FIG. 12A is a process flow diagram illustrating an aspect method for performing adaptive observations on mobile devices.

FIG. 12A illustrates an example method 1200 for performing dynamic and adaptive observations in accordance with an aspect. In block 1202, the mobile device processor may perform coarse observations by monitoring/observing a subset of large number factors/behaviors that could contribute to the mobile device's degradation. In block 1203, the mobile device processor may generate a behavior vector characterizing the coarse observations and/or the mobile device behavior based on the coarse observations. In block 1204, the mobile device processor may identify subsystems, processes, and/or applications associated with the coarse observations that may potentially contribute to the mobile device's degradation. This may be achieved, for example, by comparing information received from multiple sources with contextual information received from sensors of the mobile device. In block 1206, the mobile device processor may perform behavioral analysis operations based on the coarse observations. In an aspect, as part of blocks 1203 and 1204, the mobile device processor may perform one or more of the operations discussed above with reference to FIGS. 2-9.

In determination block 1208, the mobile device processor may determine whether suspicious behaviors or potential problems can be identified and corrected based on the results of the behavioral analysis. When the mobile device processor determines that the suspicious behaviors or potential problems can be identified and corrected based on the results of the behavioral analysis (i.e., determination block 1208="Yes"), in block 1218, the processor may initiate a process to correct the behavior and return to block 1202 to perform additional coarse observations.

When the mobile device processor determines that the suspicious behaviors or potential problems cannot be identified and/or corrected based on the results of the behavioral analysis (i.e., determination block 1208="No"), in determination block 1209 the mobile device processor may determine whether there is a likelihood of a problem. In an aspect, the mobile device processor may determine that there is a likelihood of a problem by computing a probability of the mobile device encountering potential problems and/or engaging in suspicious behaviors, and determining whether the computed probability is greater than a predetermined threshold. When the mobile device processor determines that the computed probability is not greater than the predetermined threshold and/or there is not a likelihood that suspicious behaviors or potential problems exist and/or are detectable (i.e., determination block 1209="No"), the processor may return to block 1202 to perform additional coarse observations.

When the mobile device processor determines that there is a likelihood that suspicious behaviors or potential problems exist and/or are detectable (i.e., determination block 1209="Yes"), in block 1210, the mobile device processor may perform deeper logging/observations or final logging on the identified subsystems, processes or applications. In block 1212, the mobile device processor may perform deeper and more detailed observations on the identified subsystems, processes or applications. In block 1214, the mobile device processor may perform further and/or deeper behavioral analysis based on the deeper and more detailed observations. In determination block 1208, the mobile device processor may again determine whether the suspicious behaviors or potential problems can be identified and corrected based on the results of the deeper behavioral analysis. When the mobile device processor determines that the suspicious behaviors or potential problems can not be identified and corrected based on the results of the deeper behavioral analysis (i.e., determination block 1208="No"), the processor may repeat the operations in blocks 1210-1214 until the level of detail is fine enough to identify the problem or until it is determined that the problem cannot be identified with additional detail or that no problem exists.

When the mobile device processor determines that the suspicious behaviors or potential problems can be identified and corrected based on the results of the deeper behavioral analysis (i.e., determination block 1208="Yes"), in block 1218, the mobile device processor may perform operations to correct the problem/behavior, and the processor may return to block 1202 to perform additional operations. Alternatively or in addition, as part of operations in block 1218, the mobile device processor may configure or guide further observations of mobile device behavior based on whether the observed mobile device behaviors is determined to be suspicious. Alternatively or in addition, as part of operations in block 1218, the mobile device processor may alter the user of the device and/or a client module of malicious or performance-degrading behavior in a secure, tamper-proof manner.

In a further aspect, the mobile device processor may communicate with the observer module to request deeper observation of the suspicious behavior in response to determining that the mobile device behavior is suspicious. In another aspect, the mobile device processor may send a secure tamper-proof message to the user of the device alerting to the possibility of malicious or performance-degrading behavior in response to determining that the mobile device behavior is malicious or performance-degrading behavior.

In an aspect, as part of blocks 1202-1218 of method 1200, the mobile device processor may perform real-time behavior analysis of the system's behaviors to identify suspicious behavior from limited and coarse observations, to dynamically determine the behaviors to observe in greater detail, and to dynamically determine the precise level of detail required for the observations. This enables the mobile device processor to efficiently identify and prevent problems from occurring, without requiring the use of a large amount of processor, memory, or battery resources on the device.

Figure 12B:
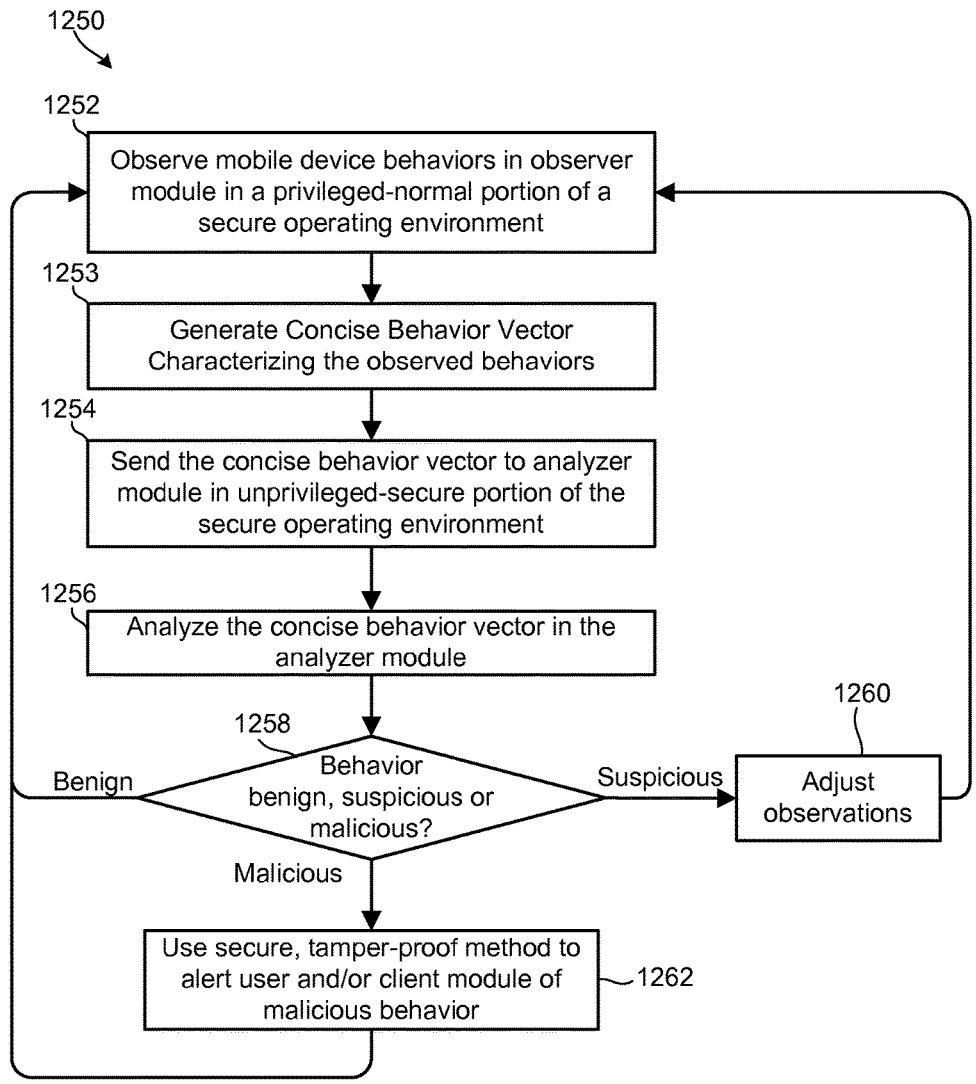
FIG. 12B is a process flow diagram illustrating another aspect method for performing adaptive observations on mobile devices over a trusted execution environment.

FIG. 12B illustrates a further embodiment method 1250 for adapting the manner in which mobile device behaviors are observed and analyzed based on the results of the observations. In block 1252 of method 1250, the processor of the mobile device may observed mobile device behaviors in an observer module that is operating within a privileged-normal portion of a secure operating environment executing within the processor. Operating in such a privileged portion of the secure operating environment places the observer module beyond reach of malware or user manipulation, thereby providing greater security for the system. In block 1253, the observer module may generate a concise behavior vector that characterizes the observed behaviors. Such a concise behavior vector may be similar to the behavior vectors described above. In block 1254, the observer module may send the concise behavior vector to an analyzer module that is executing within an unprivileged-secure portion of the secure operating environment executing on the processor. This operation in block 1254 may involve storing the concise behavior vector in a secure buffer that is also accessible by the analyzer module. This operation in block 1254 may also, or alternatively, involve sending the vector across a secure protection boundary within the secure operating environment.

In block 1256, the analyzer module may analyze the concise behavior vector in order to determine whether the observed behaviors are benign, suspicious, or malicious in determination block 1258. If the analyzer module determines that the observed behaviors are benign, the processor may continue observing mobile device behaviors in the observer module in block 1252.

If the analyzer module determines that the behaviors are suspicious, in block 1260 the analyzer module or another module executing in the processor may request adjustment in the type of behavior observations that are made by the observer module. For example, in response to recognizing a suspicious behavior, the analyzer module may communicate with the observer module to request deeper observation of the suspicious behavior.

If the analyzer module determines that the behaviors are malicious, in block 1262 the analyzer module or another module executing in the processor may use a secure, pepper-proof method to alert the user of the mobile device and/or a client module executing in the mobile device. This operation in block 1262 may involve sending a result of the analysis to the client module in an unprivileged-normal portion of the secure operating environment by writing the result in a secure buffer. When the user is notified, the operation in block 1262 may involve sending a secure tamper-proof message to the user of the device alerting to the possibility of malicious or performance-degrading behavior in response to determining that the mobile device behavior is malicious or performance-degrading behavior.

The operations in method 1250 may be executed continuously such that observations of the mobile device behaviors continue even as behavior vectors are analyzed by the analyzer module and further actions are taken in response.

Figure 13:
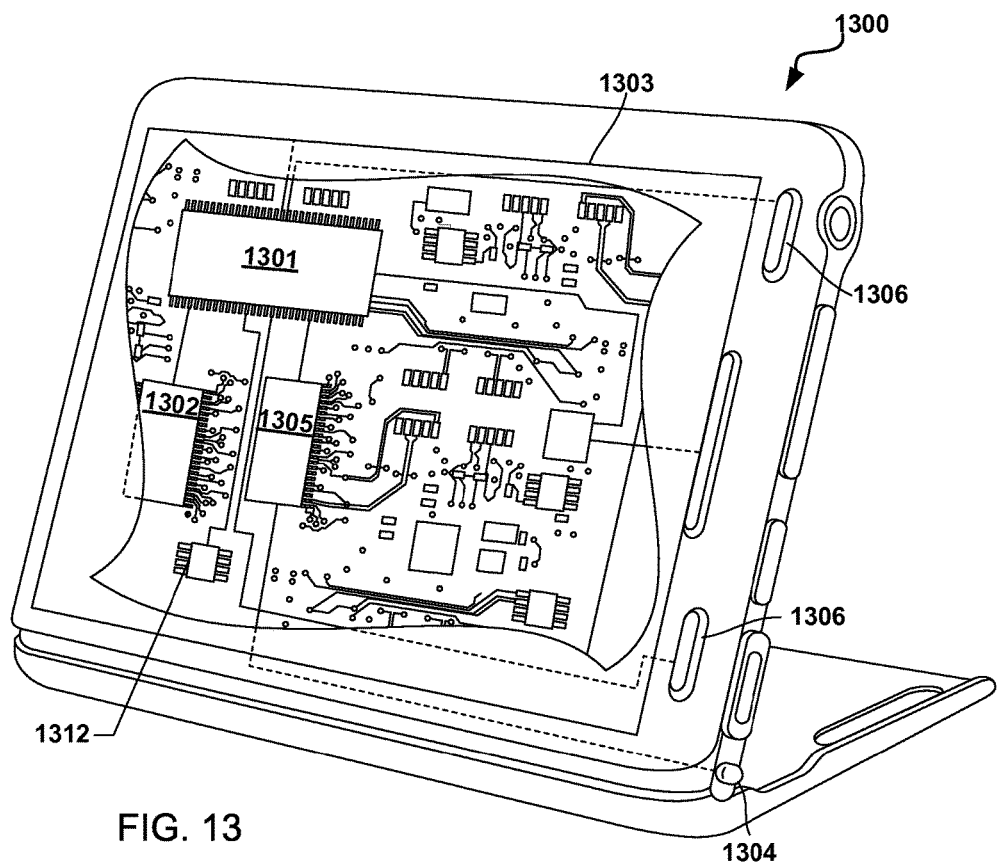
FIG. 13 is a component block diagram of a mobile device suitable for use in an aspect.

The various aspects may be implemented on a variety of mobile computing devices, an example of which is illustrated in FIG. 13 in the form of a smartphone. A smartphone 1300 may include a processor 1301 coupled to internal memory 1302, a display 1303, and to a speaker. Additionally, the smartphone 1300 may include an antenna 1304 for sending and receiving electromagnetic radiation that may be connected to a wireless data link and/or cellular telephone transceiver 1305 coupled to the processor 1301. Smartphone 1300 typically also include menu selection buttons or rocker switches 1306 for receiving user inputs.

A typical smartphone 1300 also includes a sound encoding/decoding (CODEC) circuit 1312, which digitizes sound received from a microphone into data packets suitable for wireless transmission and decodes received sound data packets to generate analog signals that are provided to the speaker to generate sound. Also, one or more of the processor 1301, wireless transceiver 1305 and CODEC 1312 may include a digital signal processor (DSP) circuit (not shown separately).

Figure 14:
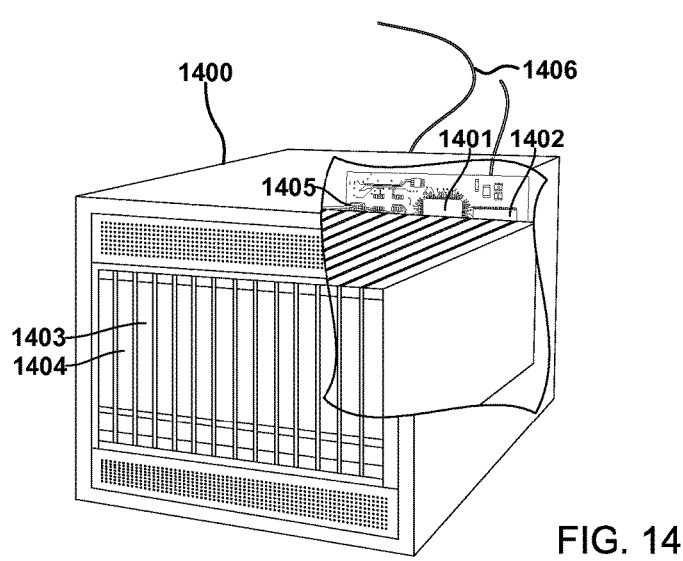
FIG. 14 is a component block diagram of a server device suitable for use in an aspect.

Portions of the aspect methods may be accomplished in a client-server architecture with some of the processing occurring in a server, such as maintaining databases of normal operational behaviors, which may be accessed by a mobile device processor while executing the aspect methods. Such aspects may be implemented on any of a variety of commercially available server devices, such as the server 1400 illustrated in FIG. 14. Such a server 1400 typically includes a processor 1401 coupled to volatile memory 1402 and a large capacity nonvolatile memory, such as a disk drive 1403. The server 1400 may also include a floppy disc drive, compact disc (CD) or DVD disc drive 1404 coupled to the processor 1401. The server 1400 may also include network access ports 1405 coupled to the processor 1401 for establishing data connections with a network 1406, such as a local area network coupled to other broadcast system computers and servers.

The processors 1301, 1401 may be any programmable microprocessor, microcomputer or multiple processor chip or chips that can be configured by software instructions (applications) to perform a variety of functions, including the functions of the various aspects described below. In some mobile devices, multiple processors 1301 may be provided, such as one processor dedicated to wireless communication functions and one processor dedicated to running other applications. Typically, software applications may be stored in the internal memory 1302, 1402, 1403 before they are accessed and loaded into the processor 1301, 1401. The processor 1301, 1401 may include internal memory sufficient to store the application software instructions.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of classifying behaviors in a mobile device, comprising:
   generating a behavior vector in a privileged-normal portion of a secure operating environment of the mobile device based on behavior information collected via an observer component in the privileged-normal portion of the secure operating environment;
   sending the behavior vector across a secure protection boundary of the secure operating environment by sending the behavior vector from the privileged-normal portion of the secure operating environment to an analyzer component in an unprivileged-secure portion of the secure operating environment; and
   determining whether a device behavior can be classified based on a result of applying the behavior vector to a classifier model in the unprivileged-secure portion of the secure operating environment.

2. The method of claim 1, wherein determining whether the device behavior can be classified based on the result of applying the behavior vector to the classifier model in the unprivileged-secure portion of the secure operating environment comprises determining whether the device behavior can be classified as one of benign and non-benign based on the result of applying the behavior vector to the classifier model in the unprivileged-secure portion of the secure operating environment.

3. The method of claim 2, further comprising:
   using a secure message to alert a user of the mobile device of a possibility of malicious or performance-degrading behavior in response to classifying the device behavior as non-benign.

4. The method of claim 2, further comprising:
   classifying the device behavior as suspicious in response to determining that the device behavior cannot be classified as one of benign and non-benign based on the result of applying the behavior vector to the classifier model in the unprivileged-secure portion of the secure operating environment; and
   observing the device behavior in response to classifying the device behavior as suspicious.

5. The method of claim 4, wherein observing the device behavior in response to classifying the device behavior as suspicious comprises communicating with the observer component to request deeper observation of device behaviors.

6. The method of claim 1, wherein sending the behavior vector from the privileged-normal portion of the secure operating environment to the analyzer component in the unprivileged-secure portion of the secure operating environment comprises storing the behavior vector in a secure buffer.

7. The method of claim 1, wherein generating the behavior vector in the privileged-normal portion of the secure operating environment based on the behavior information collected via the observer component in the privileged-normal portion of the secure operating environment comprises collecting behavior information in the observer component from a component in an unprivileged-normal portion of the secure operating environment via an instrumented API.

8. The method of claim 1, wherein determining whether the device behavior can be classified based on the result of applying the behavior vector to the classifier model in the unprivileged-secure portion of the secure operating environment comprises sending the result across a second protection domain of the secure operating environment.

9. The method of claim 8, wherein sending the result across the second protection domain of the secure operating environment comprises sending the result from the unprivileged-secure portion of the secure operating environment to a client component in an unprivileged-normal portion of the secure operating environment.

10. A computing device, comprising:
    a multi-core processor including two or more processor cores, wherein one or more of the processor cores is configured with processor-executable instructions to:
    generate a behavior vector in a privileged-normal portion of a secure operating environment of the computing device based on behavior information collected via an observer component in the privileged-normal portion of the secure operating environment;
    send the behavior vector across a secure protection boundary of the secure operating environment by sending the behavior vector from the privileged-normal portion of the secure operating environment to an analyzer component in an unprivileged-secure portion of the secure operating environment; and determine whether a device behavior can be classified based on a result of applying the behavior vector to a classifier model in the unprivileged-secure portion of the secure operating environment.

11. The computing device of claim 10, wherein the one or more processor cores is configured with processor-executable instructions to determine whether the device behavior can be classified based on the result of applying the behavior vector to the classifier model in the unprivileged-secure portion of the secure operating environment by determining whether the device behavior can be classified as one of benign and non-benign based on the result of applying the behavior vector to the classifier model in the unprivileged-secure portion of the secure operating environment.

12. The computing device of claim 11, wherein the one or more processor cores is configured with processor-executable instructions to:

use a secure message to alert a user of the computing device of a possibility of malicious or performance-degrading behavior in response to classifying the device behavior as non-benign.

13. The computing device of claim 11, wherein the one or more processor cores is configured with processor-executable instructions to:

classify the device behavior as suspicious in response to determining that the device behavior cannot be classified as one of benign and non-benign based on the result of applying the behavior vector to the classifier model in the unprivileged-secure portion of the secure operating environment; and observe the device behavior in response to classifying the device behavior as suspicious.

14. The computing device of claim 13, wherein the one or more processor cores is configured with processor-executable instructions to observe the device behavior in response to classifying the device behavior as suspicious by communicating with the observer component to request deeper observation of device behaviors.

15. The computing device of claim 10, wherein the one or more processor cores is configured with processor-executable instructions to send the behavior vector from the privileged-normal portion of the secure operating environment to the analyzer component in the unprivileged-secure portion of the secure operating environment by storing the behavior vector in a secure buffer.

16. The computing device of claim 10, wherein the one or more processor cores is configured with processor-executable instructions to generate the behavior vector in the privileged-normal portion of the secure operating environment based on the behavior information collected via the observer component in the privileged-normal portion of the secure operating environment by collecting behavior information in the observer component from a component in an unprivileged-normal portion of the secure operating environment via an instrumented API.

17. The computing device of claim 10, wherein the one or more processor cores is configured with processor-executable instructions to determine whether the device behavior can be classified based on the result of applying the behavior vector to the classifier model in the unprivileged-secure portion of the secure operating environment by sending the result across a second protection domain of the secure operating environment.

18. The computing device of claim 17, wherein the one or more processor cores is configured with processor-executable instructions to send the result across the second protection domain of the secure operating environment by sending the result from the unprivileged-secure portion of the secure operating environment to a client component in an unprivileged-normal portion of the secure operating environment.

19. A computing device, comprising:

means for generating a behavior vector in a privileged-normal portion of a secure operating environment of the computing device based on behavior information collected via an observer component in the privileged-normal portion of the secure operating environment;

means for sending the behavior vector across a secure protection boundary of the secure operating environment by sending the behavior vector from the privileged-normal portion of the secure operating environment to an analyzer component in an unprivileged-secure portion of the secure operating environment; and means for determining whether a device behavior can be classified based on a result of applying the behavior vector to a classifier model in the unprivileged-secure portion of the secure operating environment.

20. The computing device of claim 19, wherein means for determining whether the device behavior can be classified based on the result of applying the behavior vector to the classifier model in the unprivileged-secure portion of the secure operating environment comprises means for determining whether the device behavior can be classified as one of benign and non-benign based on the result of applying the behavior vector to the classifier model in the unprivileged-secure portion of the secure operating environment.

21. The computing device of claim 20, further comprising:

means for classifying the device behavior as suspicious in response to determining that the device behavior cannot be classified as one of benign and non-benign based on the result of applying the behavior vector to the classifier model in the unprivileged-secure portion of the secure operating environment; and means for observing the device behavior in response to classifying the device behavior as suspicious.

22. A non-transitory processor-readable storage medium having stored thereon processor-executable instructions configured to cause a processor of a computing device to:

generate a behavior vector in a privileged-normal portion of a secure operating environment of the computing device based on behavior information collected via an observer component in the privileged-normal portion of the secure operating environment;

send the behavior vector across a secure protection boundary of the secure operating environment by sending the behavior vector from the privileged-normal portion of the secure operating environment to an analyzer component in an unprivileged-secure portion of the secure operating environment; and determine whether a device behavior can be classified based on a result of applying the behavior vector to a classifier model in the unprivileged-secure portion of the secure operating environment.

23. The non-transitory processor-readable storage medium of claim 22, wherein the stored processor-executable instructions are configured to cause a processor to determine whether the device behavior can be classified based on the result of applying the behavior vector to the classifier model in the unprivileged-secure portion of the secure operating environment by determining whether the device behavior can be classified as one of benign and non-benign based on the result of applying the behavior vector to the classifier model in the unprivileged-secure portion of the secure operating environment.

24. The non-transitory processor-readable storage medium of claim 23, wherein the stored processor-executable instructions are configured to cause a processor to:
use a secure message to alert a user of the computing device of a possibility of malicious or performance-degrading behavior in response to classifying the device behavior as non-benign.

25. The non-transitory processor-readable storage medium of claim 23, wherein the stored processor-executable instructions are configured to cause a processor to:
classify the device behavior as suspicious in response to determining that the device behavior cannot be classified as one of benign and non-benign based on the result of applying the behavior vector to the classifier model in the unprivileged-secure portion of the secure operating environment; and
observe the device behavior in response to classifying the device behavior as suspicious.

26. The non-transitory processor-readable storage medium of claim 25, wherein the stored processor-executable instructions are configured to cause a processor to observe the device behavior in response to classifying the device behavior as suspicious by communicating with the observer component to request deeper observation of device behaviors.

27. The non-transitory processor-readable storage medium of claim 22, wherein the stored processor-executable instructions are configured to cause a processor to send the behavior vector from the privileged-normal portion of the secure operating environment to the analyzer component in the unprivileged-secure portion of the secure operating environment by storing the behavior vector in a secure buffer.

28. The non-transitory processor-readable storage medium of claim 22, wherein the stored processor-executable instructions are configured to cause a processor to generate the behavior vector in the privileged-normal portion of the secure operating environment based on the behavior information collected via the observer component in the privileged-normal portion of the secure operating environment by collecting behavior information in the observer component from a component in an unprivileged-normal portion of the secure operating environment via an instrumented API.

29. The non-transitory processor-readable storage medium of claim 22, wherein the stored processor-executable instructions are configured to cause a processor to determine whether the device behavior can be classified based on the result of applying the behavior vector to the classifier model in the unprivileged-secure portion of the secure operating environment by sending the result across a second protection domain of the secure operating environment.

30. The non-transitory processor-readable storage medium of claim 29, wherein the stored processor-executable instructions are configured to cause a processor to send the result across the second protection domain of the secure operating environment by sending the result from the unprivileged-secure portion of the secure operating environment to a client component in an unprivileged-normal portion of the secure operating environment.

* * * * *